US012789101B2

(12) United States Patent
Qiao et al.

(10) Patent No.: US 12,789,101 B2
(45) Date of Patent: Nov. 10, 2026

(54) COMBINED SYSTEM FOR GAME LIVE-STREAMING AND GAMEPLAY

(71) Applicant: Tencent Technology (Shenzhen) Company Limited, Shenzhen (CN)

(72) Inventors: Hongyong Qiao, Shenzhen (CN); Lijun Wang, Shenzhen (CN); Xiaoyang Yang, Shenzhen (CN); Yimin Lai, Shenzhen (CN); Yi Lai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 409 days.

(21) Appl. No.: 18/243,003

(22) Filed: Sep. 6, 2023

(65) Prior Publication Data

US 2023/0405478 A1 Dec. 21, 2023

Related U.S. Application Data

(63) Continuation of application No. PCT/CN2022/133409, filed on Nov. 22, 2022.

(30) Foreign Application Priority Data

Nov. 26, 2021 (CN) ......................... 202111426139.9

(51) Int. Cl.
*A63F 13/00* (2014.01)
*A63F 13/533* (2014.01)
(Continued)

(52) U.S. Cl.
CPC ............ *A63F 13/86* (2014.09); *A63F 13/533* (2014.09); *H04N 21/2187* (2013.01); *H04N 21/4316* (2013.01)

(58) Field of Classification Search
None
See application file for complete search history.

(56) References Cited

U.S. PATENT DOCUMENTS 4,856,787 A * 8/1989 Itkis .................... G07F 17/3262 273/237
6,166,736 A * 12/2000 Hugh .................... G06F 3/0481 715/777
(Continued)

FOREIGN PATENT DOCUMENTS

CN 107551555 A 1/2018
CN 112437318 A 3/2021
(Continued)

OTHER PUBLICATIONS

Office Action received for Chinese Patent Application No. 202111426139.9, mailed on Oct. 23, 2024 with English Translation, 33 pages.
(Continued)

*Primary Examiner* — Paul A D'Agostino
(74) *Attorney, Agent, or Firm* — ARENTFOX SCHIFF LLP

(57) ABSTRACT

An interaction method for game live-streaming includes displaying, on a terminal device, a first game interface of a game application, and, in response to a first trigger operation associated with a live-streaming screen of the game application, generating and displaying a second game interface and a live-streaming screen of the game application. Generating and displaying the second game interface and the live-streaming screen includes creating a picture-in-picture view and adding the picture-in-picture view to a first region of the second game interface, and displaying, on the terminal device, the live-streaming screen in the picture-in-picture view in the first region of the second game interface.

14 Claims, 20 Drawing Sheets

(51) Int. Cl.

| | |
|---|---|
| ***A63F 13/86*** | (2014.01) |
| ***H04N 21/2187*** | (2011.01) |
| ***H04N 21/431*** | (2011.01) |

(56) References Cited

U.S. PATENT DOCUMENTS

| | | | | |
|---|---|---|---|---|
| 8,549,429 | B2 * | 10/2013 | Tsuruta | G06F 3/0488 715/767 |
| 8,850,477 | B2 * | 9/2014 | Schein | H04N 21/25875 725/51 |
| 9,118,723 | B1 * | 8/2015 | Su | G06F 15/00 |
| 9,253,430 | B2 * | 2/2016 | Levine | H04N 21/4438 |
| 9,282,377 | B2 * | 3/2016 | Bruner | H04N 21/235 |
| 9,438,937 | B1 * | 9/2016 | Buchheit | H04N 5/04 |
| 9,510,051 | B1 * | 11/2016 | Bostick | H04N 21/4788 |
| 9,916,077 | B1 * | 3/2018 | Lewis | H04N 21/23424 |
| 10,063,911 | B1 * | 8/2018 | Obara | H04N 21/4223 |
| 10,873,769 | B2 * | 12/2020 | Zhong | H04N 21/2187 |
| 2002/0183115 | A1 * | 12/2002 | Takahashi | A63F 13/35 463/42 |
| 2004/0236830 | A1 * | 11/2004 | Nelson | H04L 12/1831 709/204 |
| 2006/0282785 | A1 * | 12/2006 | McCarthy | G06T 1/00 715/760 |
| 2010/0218228 | A1 * | 8/2010 | Walter | G06F 16/7335 725/105 |
| 2013/0204930 | A1 * | 8/2013 | Hobby | H04L 65/61 709/203 |
| 2013/0278828 | A1 * | 10/2013 | Todd | H04N 21/4753 348/E5.099 |
| 2013/0291018 | A1 * | 10/2013 | Billings | H04L 51/52 725/46 |
| 2013/0337915 | A1 * | 12/2013 | Cannon | G07F 17/3244 463/31 |
| 2014/0013344 | A1 * | 1/2014 | Taxier | H04N 21/8456 725/9 |
| 2015/0143423 | A1 * | 5/2015 | Park | H04N 5/45 725/40 |
| 2015/0309681 | A1 * | 10/2015 | Plagemann | G06F 3/0304 715/863 |
| 2015/0373402 | A1 * | 12/2015 | Zimmeri | G06F 3/1423 725/59 |
| 2016/0065880 | A1 * | 3/2016 | Pearson | H04N 21/2665 348/14.07 |
| 2016/0239200 | A1 * | 8/2016 | Fang | G06F 3/017 |
| 2016/0266864 | A1 * | 9/2016 | Rajendran | H04L 12/1822 |
| 2016/0294894 | A1 * | 10/2016 | Miller | G06F 16/24578 |
| 2017/0003740 | A1 * | 1/2017 | Verfaillie | A63F 13/87 |
| 2017/0006322 | A1 * | 1/2017 | Dury | H04N 21/254 |
| 2017/0039867 | A1 * | 2/2017 | Fieldman | G09B 7/00 |
| 2017/0064240 | A1 * | 3/2017 | Mangat | A63F 13/212 |
| 2017/0085939 | A1 * | 3/2017 | Gupta | H04N 5/50 |
| 2017/0087460 | A1 * | 3/2017 | Perry | A63F 13/497 |
| 2017/0103735 | A1 * | 4/2017 | Oh | G06F 3/0482 |
| 2017/0332036 | A1 * | 11/2017 | Panchaksharaiah | H04N 5/45 |
| 2018/0035136 | A1 * | 2/2018 | Crowe | H04N 21/47211 |
| 2018/0060439 | A1 * | 3/2018 | Kula | G06F 16/24575 |
| 2018/0063556 | A1 * | 3/2018 | Kalmanson | H04N 21/234 |
| 2018/0091728 | A1 * | 3/2018 | Brown | H04N 23/62 |
| 2018/0091863 | A1 * | 3/2018 | Anguiano | H04N 21/482 |
| 2018/0095635 | A1 * | 4/2018 | Valdivia | G02B 27/0093 |
| 2018/0096504 | A1 * | 4/2018 | Valdivia | G06F 3/011 |
| 2018/0131976 | A1 * | 5/2018 | Zabelin | H04N 21/812 |
| 2018/0284885 | A1 * | 10/2018 | Kim | G06F 3/013 |
| 2019/0043233 | A1 * | 2/2019 | Kim | G06T 11/60 |
| 2019/0090014 | A1 * | 3/2019 | Shoop | H04N 21/4823 |
| 2019/0099678 | A1 * | 4/2019 | Khan | A63F 13/86 |
| 2019/0110087 | A1 * | 4/2019 | Parasseeri | H04N 21/21805 |
| 2019/0179509 | A1 * | 6/2019 | Daie | G06F 3/04815 |
| 2019/0200051 | A1 * | 6/2019 | Paul | G06Q 10/40 |
| 2019/0200054 | A1 * | 6/2019 | Dharmaji | H04L 65/80 |
| 2019/0200090 | A1 * | 6/2019 | Merced | H04N 21/4826 |
| 2019/0230409 | A1 * | 7/2019 | Panda | H04N 21/4223 |
| 2019/0335245 | A1 * | 10/2019 | Sprenger | H04N 21/4334 |
| 2019/0347181 | A1 * | 11/2019 | Cranfill | G06F 3/048 |
| 2020/0053401 | A1 * | 2/2020 | Obara | G06F 16/7867 |
| 2020/0382724 | A1 * | 12/2020 | Pena | G06F 3/04883 |
| 2021/0084254 | A1 * | 3/2021 | Lowry | H04N 21/21805 |
| 2025/0004557 | A1 * | 1/2025 | Ramirez-Aristizabal | G06V 40/15 |
| 2025/0254403 | A1 * | 8/2025 | Hannuksela | H04N 5/45 |

FOREIGN PATENT DOCUMENTS

| | | | | |
|---|---|---|---|---|
| CN | 113244609 A | | 8/2021 | |
| CN | 114210071 A | | 3/2022 | |
| EP | 1848212 A2 | * | 10/2007 | H04N 21/4345 |
| JP | 2008-305141 A | | 12/2008 | |
| JP | 2021-100586 A | | 7/2021 | |

OTHER PUBLICATIONS

DougaFun (MovieFun), "[Youtube] You can now play videos using the mini player on your browser!", Available online at: <https://www.youtube.com/watch?v=90gBpuiJweU>, 2018, pp. 1-3 (Original copy only).

Office Action received for Japanese Patent Application No. 2024-522661, mailed on Apr. 1, 2025, 15 pages (8 pages of English Translation and 7 pages of Original Document).

International Search Report issued Feb. 16, 2023 in Application No. PCT/CN2022/133409, with English Translation, pp. 1-7.

* cited by examiner

COMBINED SYSTEM FOR GAME LIVE-STREAMING AND GAMEPLAY

RELATED APPLICATIONS

This disclosure is a continuation of International Application No. PCT/CN2022/133409, filed on Nov. 22, 2022, which claims priority to Chinese Patent Application No. 202111426139.9, entitled "INTERACTION METHOD FOR GAME LIVE-STREAMING, STORAGE MEDIUM, PROGRAM PRODUCT, AND ELECTRONIC DEVICE", and filed on Nov. 26, 2021. The disclosures of the prior applications are hereby incorporated by reference in their entirety.

FIELD OF THE TECHNOLOGY

This disclosure relates to the field of computers, including an interaction method for game live-streaming, a storage medium, a program product, and an electronic device.

BACKGROUND OF THE DISCLOSURE

Currently, when a live-streaming screen is played through a game application, the live-streaming screen usually occupies all or a large portion of a display screen of the game application. When a user needs to perform other game operations while watching the live-streaming screen, the user needs to close the current live-streaming screen to perform other game operations. However, the foregoing operation procedure is complex, and the user cannot perform other game operations while watching the live-streaming screen, leading to complex operation methods for the user. Because it is impossible to watch a live stream and perform other game operations at the same time, there is a technical problem of low user operation efficiency in the related art.

For the foregoing problem, no effective solution has been provided at present.

SUMMARY

Embodiments of this disclosure provide an interaction method for game live-streaming, a storage medium, a program product, and an electronic device, to help resolve a technical problem of relatively low user operation efficiency existing in the related art.

In an embodiment, an interaction method for game live-streaming includes displaying, on a terminal device, a first game interface of a game application, and, in response to a first trigger operation associated with a live-streaming screen of the game application, generating and displaying a second game interface and a live-streaming screen of the game application. Generating and displaying the second game interface and the live-streaming screen includes creating a picture-in-picture view and adding the picture-in-picture view to a first region of the second game interface, and displaying, on the terminal device, the live-streaming screen in the picture-in-picture view in the first region of the second game interface.

In an embodiment, an interaction method for game live-streaming includes generating and displaying, on a terminal device, a game match interface and a live-streaming screen in a first game interface of a game application, the live-streaming screen being located in a first region of the game match interface. The method further includes canceling the display of the live-streaming screen in response to a first trigger operation associated with the live-streaming screen.

In an embodiment, an apparatus for game live-streaming includes processing circuitry configured to display a first game interface of a game application, and, in response to a first trigger operation associated with a live-streaming screen of the game application, generate and display a second game interface and a live-streaming screen of the game application. Generating and displaying the second game interface and the live-streaming screen includes creating a picture-in-picture view and adding the picture-in-picture view to a first region of the second game interface, and displaying the live-streaming screen in the picture-in-picture view in the first region of the second game interface.

BRIEF DESCRIPTION OF THE DRAWINGS

The accompanying drawings described herein are used to provide a further understanding of this disclosure, and constitute part of this disclosure. Exemplary embodiments of this disclosure and descriptions thereof are used to explain this disclosure, and do not constitute any inappropriate limitation on this disclosure. In the accompanying drawings.

DESCRIPTION OF EMBODIMENTS

In order to make a person skilled in the art better understand the solutions of this disclosure, the following describes the technical solutions in the embodiments of this disclosure with reference to the accompanying drawings in the embodiments of this disclosure. The described embodiments are only some of the embodiments of this disclosure rather than all of the embodiments. All other embodiments obtained by a person of ordinary skill in the art based on the embodiments of this disclosure shall fall within the protection scope of this disclosure.

In this specification, the claims, and the accompanying drawings of this disclosure, the terms "first", "second", and so on are intended to distinguish similar objects but do not necessarily indicate a specific order or sequence. It is to be understood that the data termed in such a way is interchangeable in proper circumstances, so that the embodiments of this disclosure described herein can be implemented in other sequences than the sequence illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

First, some nouns or terms appearing in a process of describing the embodiments of this disclosure are suitable for the following explanations:

Picture-in-picture is a video content presentation manner, means that when one video is played in full-screen mode, another video is played in a small-area region of the screen at the same time, and is widely used in television, video recording, monitoring, demonstration devices, and the like.

A floating window is a system tool for a computer or a smartphone, and is a movable window floating on a surface of another application to open different applications. To use a floating window in a mobile phone, system authorization is required.

Unity is a game development engine for real-time 3D interactive content creation.

An App is software installed on a smartphone.

A View is a general term for an interface view of a mobile terminal.

The following describes this disclosure with reference to the embodiments.

Figure 1:
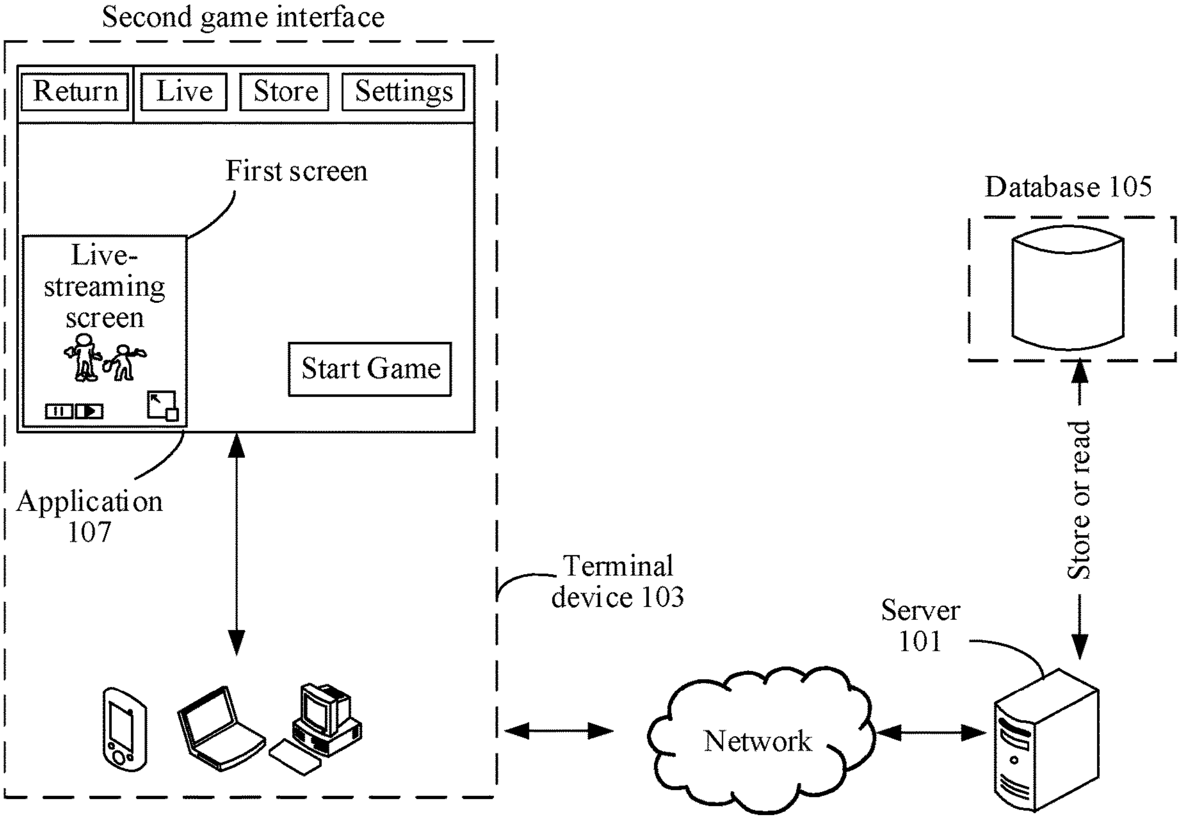
FIG. 1 is a schematic diagram of an application environment of an interaction method for game live-streaming according to an embodiment of this disclosure.

According to one aspect of the embodiments of this disclosure, an interaction method for game live-streaming is provided. In this embodiment, the foregoing interaction method for game live-streaming may be applied to a hardware environment including a server 101 and a terminal device 103 shown in FIG. 1. As shown in FIG. 1, the server 101 is connected to the terminal device 103 through a network, and may be configured to provide a service for the terminal device or an application installed on the terminal device. The application may be a video application, an instant messaging application, a browser application, an educational application, a game application, or the like. A database 105, for example, a game data storage server, may be provided on the server or independently from the server for providing a data storage service for the server 101. The foregoing network may include, but is not limited to: a wired network or a wireless network. The wired network includes a local area network, a metropolitan area network, and a wide area network. The wireless network includes Bluetooth, Wi-Fi, and other networks for implementing wireless communication. The terminal device 103 may be a terminal on which an application is configured, and may include, but is not limited to, at least one of the following: a mobile phone (such as an Android mobile phone or an iOS mobile phone), a notebook computer, a tablet computer, a palmtop computer, a mobile Internet device (MID), a PAD, a desktop computer, a smart television, and other computer devices. The server may be a single server, or may be a server cluster including a plurality of servers, or a cloud server. An application 107 using the interaction method for game live-streaming is displayed through the terminal device 103.

With reference to FIG. 1, the interaction method for game live-streaming may be implemented on the terminal device 103 through the following steps:

S1. Display a first game interface of a target game application, the first game interface including a game live-streaming screen of the target game application.

S2. Generate and display a second game interface and a target screen of the target game application in response to a first trigger operation for the game live-streaming screen, and display the game live-streaming screen in the target screen, the target screen being located in a first region of the second game interface.

In this embodiment, the foregoing interaction method for game live-streaming may be further implemented through a server, for example, implemented in the server 101 shown in FIG. 1; or may be implemented jointly by a user terminal and a server.

The foregoing description is only an example and is not specifically limited in this embodiment.

Figure 2:
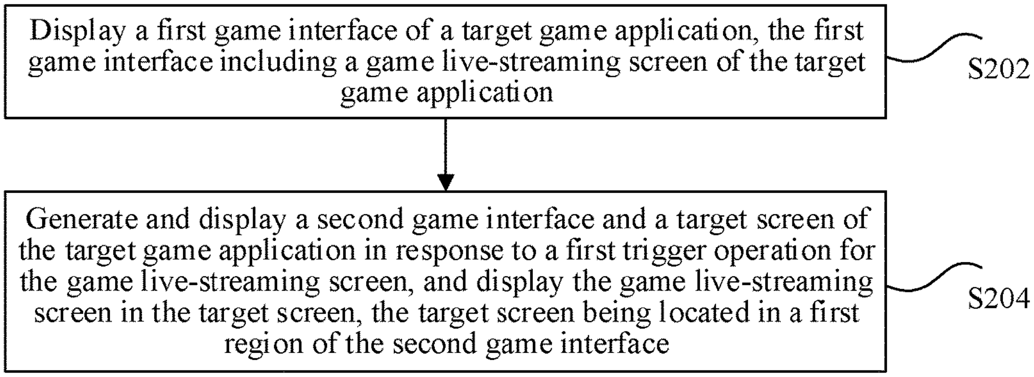
FIG. 2 is a schematic flowchart of an interaction method for game live-streaming according to an embodiment of this disclosure.

In an implementation, as shown in FIG. 2, the foregoing interaction method for game live-streaming includes the following steps:

S202. Display a first game interface of a target game application, the first game interface including a game live-streaming screen of the target game application.

S204. Generate and display a second game interface and a target screen of the target game application in response to a first trigger operation for the game live-streaming screen, and display the game live-streaming screen in the target screen, the target screen being located in a first region of the second game interface. For example, in response to a first trigger operation associated with a live-streaming screen of the game application, a second game interface and a live-streaming screen of the game application are generated and displaying, which includes creating a picture-in-picture view and adding the picture-in-picture view to a first region of the second game interface, and displaying the live-streaming screen in the picture-in-picture view in the first region of the second game interface.

In this embodiment, application scenarios of the interaction method for game live-streaming may include, but are not limited to, target game applications of various application scenarios such as medical care, finance, credit reporting, banking, government affairs, government, energy, education, security, buildings, games, transportation, Internet of Things, and industries.

In this embodiment, the target game application may be a multiplayer online battle arena game (MOBA) application, or may a single-player game (SPG) application. Types of the foregoing game application may include, but are not limited to, at least one of the following: two-dimensional (2D) game application, three-dimensional (3D) game application, virtual reality (VR) game application, augmented reality (AR) game application, and mixed reality (MR) game application. The foregoing description is only an example, and this is not limited in this embodiment.

Moreover, a shooter game application may be a third-person shooter game (TPS) application, such as running the shooter game application from a viewing angle of a third-party character object other than a current virtual character controlled by a player, or may be a first-person shooter game (FPS) application, such as running the shooter game application from a viewing angle of a current virtual character controlled by a player.

In this embodiment, the first game interface may include, but is not limited to, the game live-streaming screen of the target game application, and specifically, may include, but is not limited to, a game live-streaming screen of a game being played by another user using the target game application, or may include, but is not limited to, a game live-streaming screen being played after recording is completed, or may include, but is not limited to, a live-streaming sitelink obtained from another live-streaming website. Live-streaming content corresponding to the live-streaming sitelink is associated with the target game application. For example, there is at least one anchor live-streaming game content of the target game application on a live-streaming website, and the game content may be directly played in the first game interface by obtaining the live-streaming sitelink.

The foregoing description is only an example and there is no specific limitations in this embodiment.

In this embodiment, the first trigger operation may include, but is not limited to, click/tap, press/hold, slide, release, double-click/tap, and other trigger operations, or may include, but is not limited to, a trigger operation implemented in a manner of a gesture, voice, or an action. For example, the first trigger operation may include, but is not limited to, tapping a touch button for displaying the target screen to generate and display the second game interface and the target screen in response to the first trigger operation. The first trigger operation may further include, but is not limited to, using a three-finger pinch-up gesture to generate and display the second game interface and the target screen in response to the first trigger operation.

In this embodiment, game content of the second game interface may be the same as or different from game content of the first game interface, but a size of the first region corresponding to the game live-streaming screen in the second game interface is obviously smaller than a size corresponding to the game live-streaming screen in the first game interface.

In this embodiment, the first game interface may display the game live-streaming screen by using a full screen, or may display the game live-streaming screen by using more than half of the screen. The size of the first region corresponding to the target screen may be preset by a system, or may be adjusted by a user according to a size adjustment instruction. The size adjustment instruction may include, but is not limited to, clicking/taping on a button for size adjustment, for example, “Large”, “Medium”, “Small”, or may include, but is not limited to, dragging edges of the target screen to adjust the size of the first region.

Figure 3:
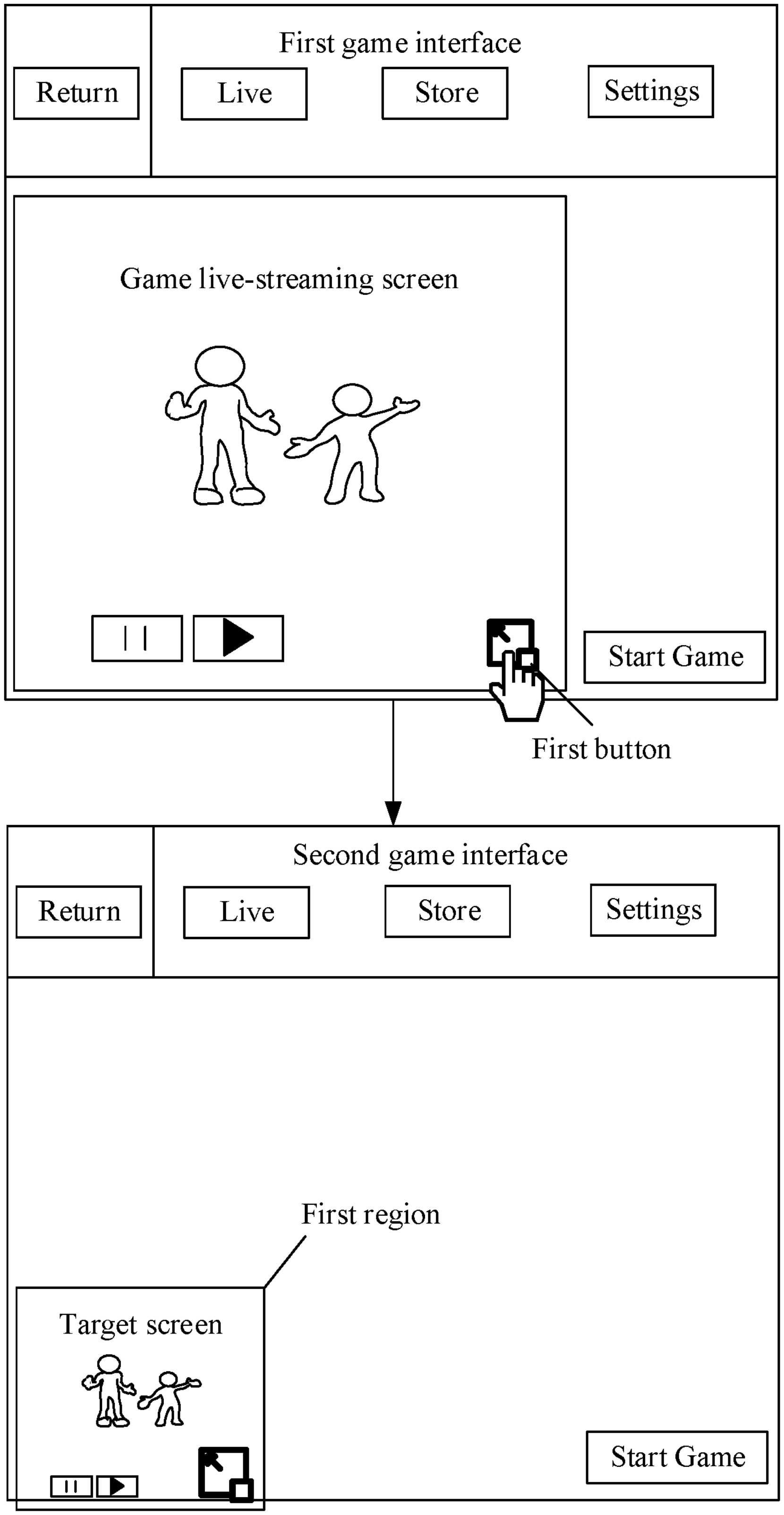
FIG. 3 is a schematic diagram of an interaction method for game live-streaming according to an embodiment of this disclosure.

For example, FIG. 3 is a schematic diagram of another interaction method for game live-streaming according to an embodiment of this disclosure. As shown in FIG. 3, a first trigger operation on a first button is obtained in the first game interface, the game live-streaming screen is displayed in the first region as the target screen in response to the first trigger operation, playing of the game live-streaming screen is maintained in a form of a picture-in-picture window, and the second game interface is displayed in the game interface at the same time.

The target screen further displays virtual buttons for controlling playing of the target screen, for example, buttons such as Pause and Play.

The foregoing description is only an example and there is no specific limitations in this embodiment.

Through this embodiment, the first game interface of the target game application is displayed, the first game interface including the game live-streaming screen of the target game application, the second game interface and the target screen of the target game application are displayed in response to the first trigger operation for the game live-streaming screen, and the game live-streaming screen is displayed in the target screen, the target screen being located in the first region of the second game interface. In such a manner, when the game live-streaming screen is being played in the game interface, in response to the first trigger operation, the playing of the game live-streaming screen is maintained in the form of the picture-in-picture window, and the second game interface is displayed in the game interface at the same time, so that when a user is watching a game live-streaming screen, the user can also perform other game operations, thereby achieving a technical effect of improving user operation efficiency, and thus resolving the technical problem of relatively low user operation efficiency existing in the related art. In other words, in the terminal device (for example, the terminal device 103), in this embodiment of this disclosure, there is no need to close or minimize the live-streaming screen to perform other game operations. Instead, the live-streaming screen is played in the game interface in the picture-in-picture manner, and other game operations are performed in the game interface. In this way, convenience of interaction operations is improved, thereby improving the efficiency of interaction operations.

In a solution, the foregoing method further includes:

hiding the target screen in response to a second trigger operation for the target screen during the display of the target screen; and displaying the target screen in response to a third trigger operation for the target screen in a case that the target screen is in a hidden state.

In this embodiment, the second trigger operation and the third trigger operation may include, but are not limited to, being the same as or different from the first trigger operation;

may include, but are not limited to, click/tap, press/hold, slide, release, double-click/tap, and other trigger operations; or may include, but are not limited to, trigger operations implemented in a manner of gestures, voice, or actions.

In this embodiment, the hiding the target screen may include, but is not limited to, minimizing the target screen to the bottom of the second game interface to implement hiding. The displaying the target screen in response to a third trigger operation for the target screen in a case that the target screen is in a hidden state may include, but is not limited to, performing the third trigger operation on a preset virtual button to call out the target screen in the hidden state again to display the target screen.

In this embodiment, when the target game application is switched to run in a backend, the target screen may be automatically hidden. When the target game application is switched from the backend back to a foreground, the target screen is displayed. In other words, the second trigger operation may include, but is not limited to, a trigger operation of switching the target game application to the backend. The third trigger operation may include, but is not limited to, a trigger operation of switching the target game application from the backend to the foreground.

Figure 4:
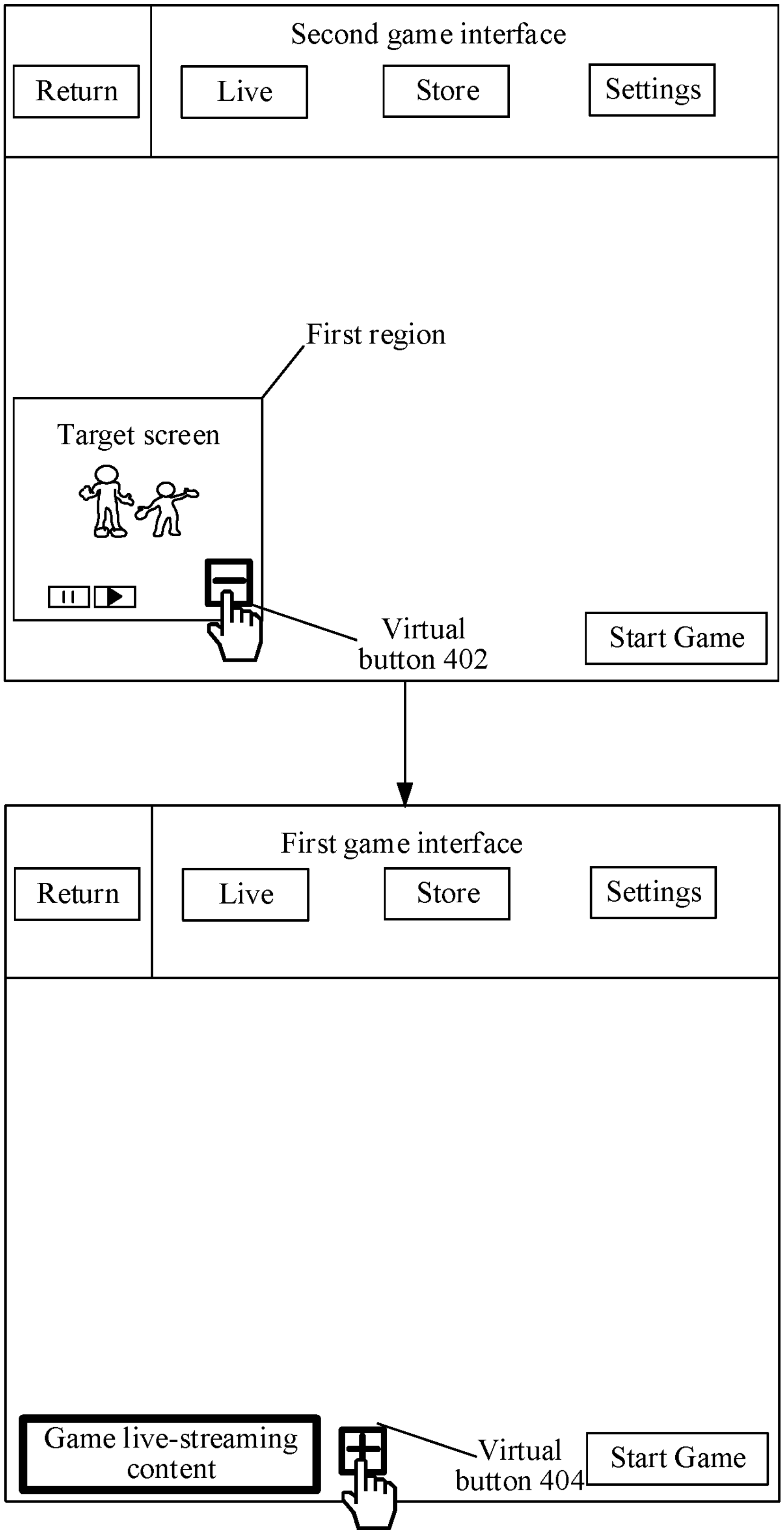
FIG. 4 is a schematic diagram of another interaction method for game live-streaming according to an embodiment of this disclosure.

For example, FIG. 4 is a schematic diagram of another interaction method for game live-streaming according to an embodiment of this disclosure. As shown in FIG. 4, when the second trigger operation is performed on a virtual button 402, the target screen may be configured to be in the hidden state (minimized). When the target screen is in the hidden state, a third trigger operation may be performed on the virtual button 404 to redisplay the target screen.

The foregoing description is only an example and there is no specific limitations in this embodiment.

In a solution,

- the hiding the target screen in response to a second trigger operation for the target screen during the display of the target screen includes: hiding the target screen in response to a first slide operation for the target screen during the display of the target screen; and
- the displaying the target screen in response to a third trigger operation for the target screen in a case that the target screen is in a hidden state includes: displaying the target screen in response to a second slide operation for the target screen in a case that the target screen is in the hidden state, a slide direction of the first slide operation being opposite to a slide direction of the second slide operation.

In this embodiment, it may include, but is not limited to, hiding the target screen by using the first slide operation, for example, switching the target game application to the back-end through an upward sliding operation to hide the target screen; and it may include, but is not limited to, displaying the target screen by using the second slide operation, for example, switching the target game application from the backend to a foreground through a downward sliding operation to display the target screen. Slide directions of the upward sliding operation and the downward sliding operation are opposite. Certainly, the operations may alternatively be a leftward sliding operation and a rightward sliding operation, and so on.

Figure 5:
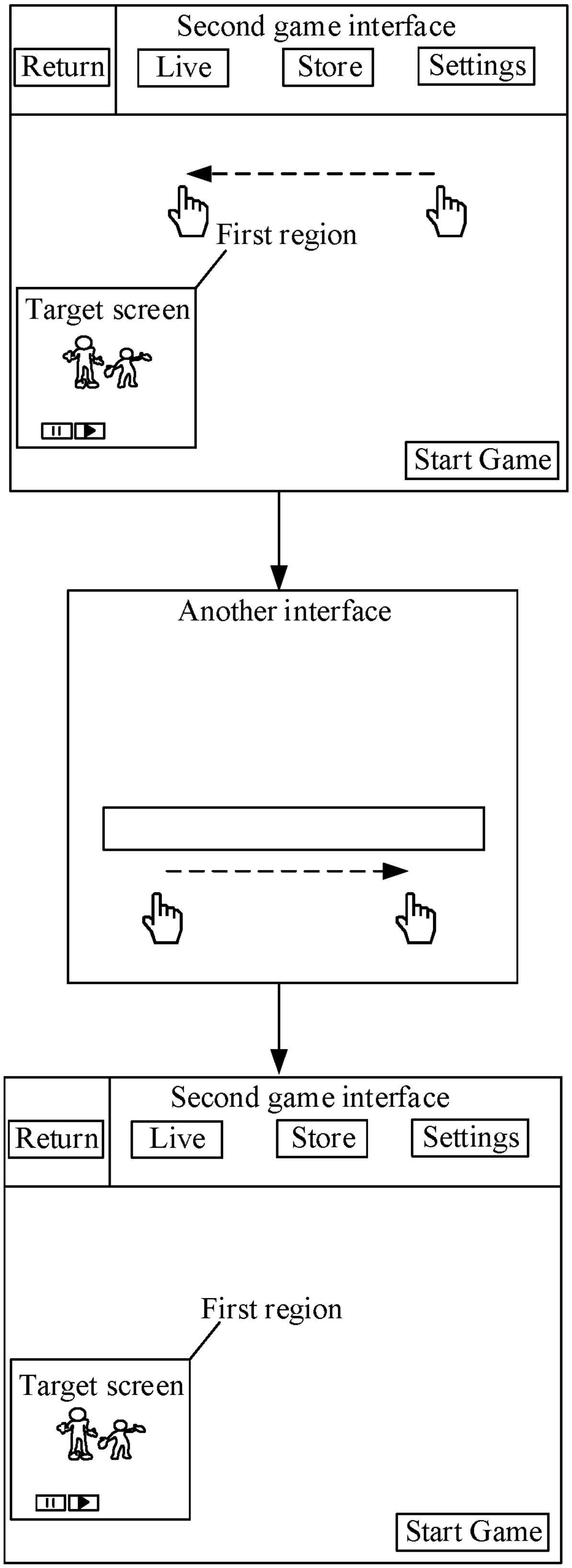
FIG. 5 is a schematic diagram of another interaction method for game live-streaming according to an embodiment of this disclosure.

For example, FIG. 5 is a schematic diagram of another interaction method for game live-streaming according to an embodiment of this disclosure. As shown in FIG. 5, when the first slide operation is performed on the target game application to slide leftward, the target game application is switched to the backend, and the target screen is configured to be in the hidden state. When the second slide operation is performed on the target game application to slide rightward, the target game application is switched from the backend to the foreground to redisplay the target screen.

In a solution, the generating and displaying a second game interface and a target screen of the target game application in response to a first trigger operation for the game live-streaming screen includes at least one of the following:

- generating and displaying the second game interface and the target screen of the target game application in response to a touch interactive operation for the game live-streaming screen;
- generating and displaying the second game interface and the target screen of the target game application in response to a gesture operation for the game live-streaming screen;
- generating and displaying the second game interface and the target screen of the target game application in response to a voice interaction operation for the game live-streaming screen; or
- generating and displaying the second game interface and the target screen of the target game application in response to a mouse control operation for the game live-streaming screen.

In this embodiment, the touch interactive operation may include, but is not limited to, a touch operation performed on a touchscreen. The gesture operation may include, but is not limited to, two-finger pinch-up, three-finger pinch-down, and the like. The voice interaction operation may include, but is not limited to, receiving a voice message "Split screen live-streaming, thanks". The mouse control operation may include, but is not limited to, clicking/tapping, pressing/holding, dragging, or other operations.

In a solution, the generating and displaying a second game interface and a target screen of the target game application in response to a first trigger operation for the game live-streaming screen includes:

- switching a displayed game interface from the first game interface to a previous game interface before entry of the first game interface in response to the first trigger operation, and displaying the target screen, the second game interface being the previous game interface; or
- switching a displayed game interface from the first game interface to a game lobby interface of the target game application in response to the first trigger operation, and displaying the target screen, the second game interface being the game lobby interface.

In this embodiment, the previous game interface before the first game interface is a last game interface relative to the first game interface. For example, when the previous game interface of the first game interface is a store interface, the displayed game interface is switched from the first game interface to the store interface in response to the first trigger operation, and the target screen is displayed.

Figure 6:
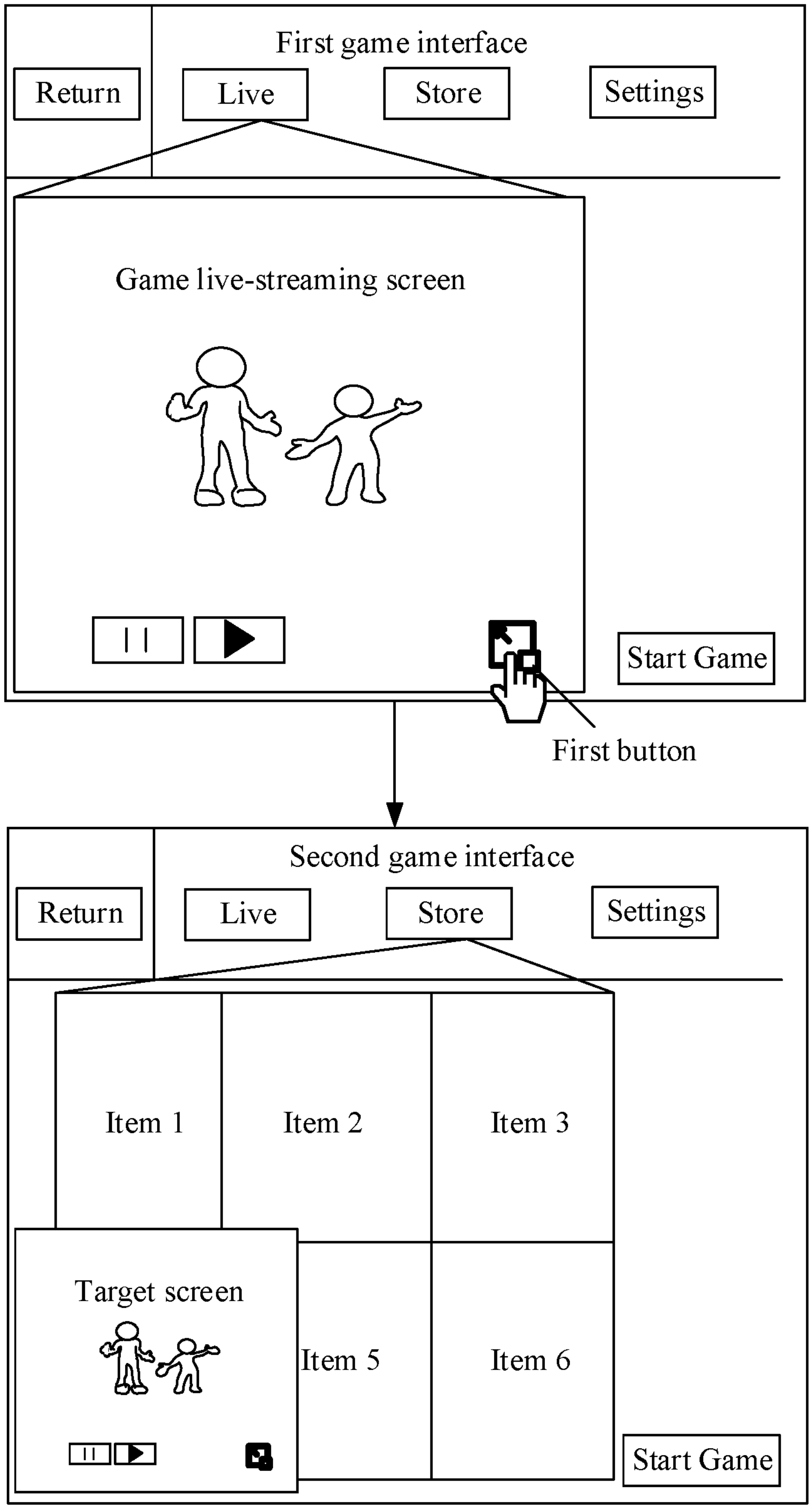
FIG. 6 is a schematic diagram of another interaction method for game live-streaming according to an embodiment of this disclosure.

For example, FIG. 6 is a schematic diagram of another interaction method for game live-streaming according to an embodiment of this disclosure. As shown in FIG. 6, a game live-streaming screen is currently displayed in the first game interface. The first trigger operation is performed on a first button to switch the first game interface to a second game interface (a store interface), and the target screen is displayed.

In this embodiment, the game lobby interface is a default initial interface of the target game application, which may include, but is not limited to, having a store interface corresponding to a store control, a game start interface corresponding to a game start control, and the like, to switch to an interface corresponding to a control by performing a trigger operation on the control.

Figure 7:
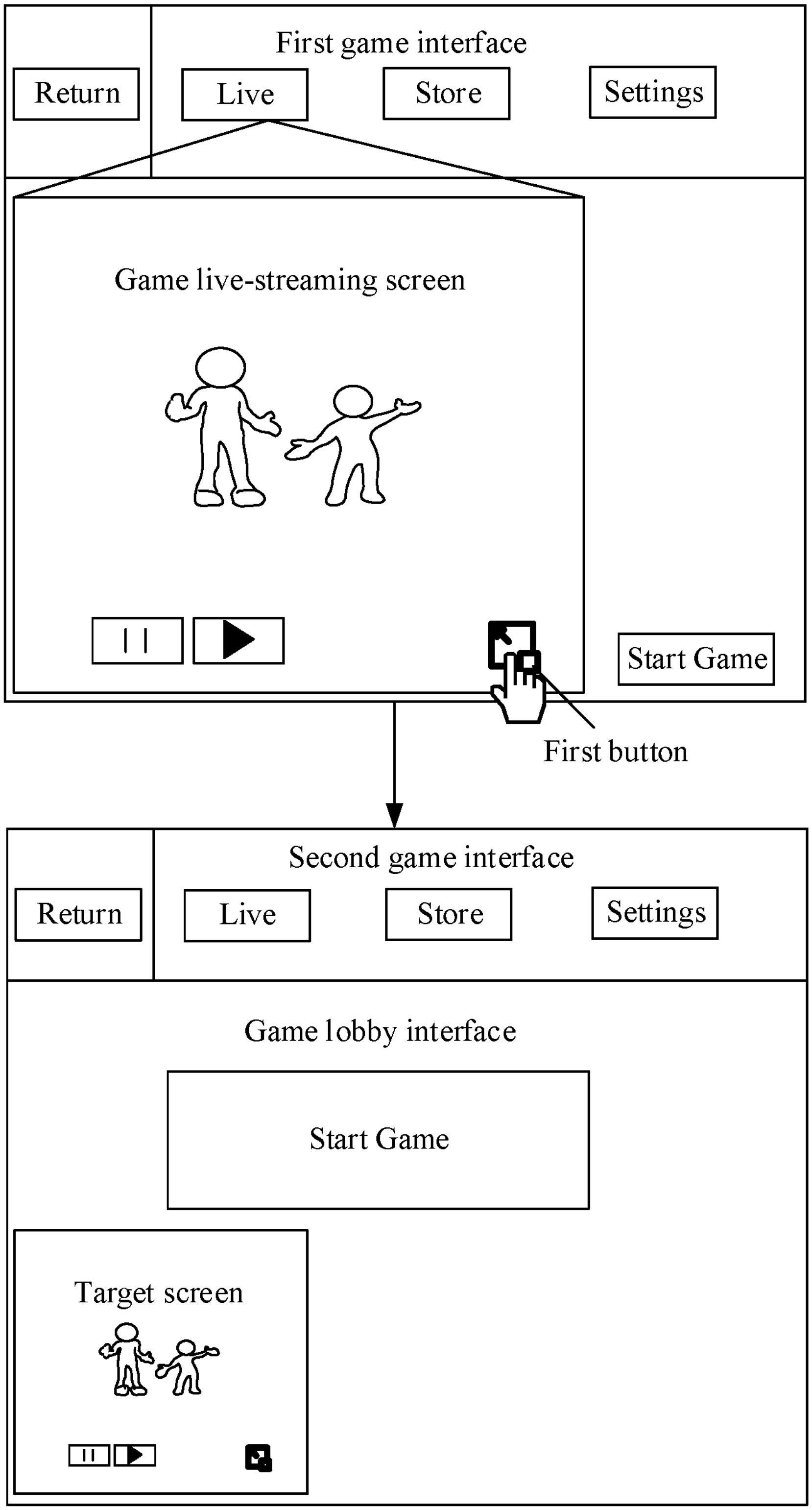
FIG. 7 is a schematic diagram of another interaction method for game live-streaming according to an embodiment of this disclosure.

For example, FIG. 7 is a schematic diagram of another interaction method for game live-streaming according to an embodiment of this disclosure. As shown in FIG. 7, a game live-streaming screen is currently displayed in the first game interface. The first trigger operation is performed on a first button to switch the first game interface to a second game interface (a game lobby interface, including a game start button "Start Game"), and the target screen is displayed.

In a solution, the method further includes:

switching a displayed game interface from the second game interface to a third game interface of the target game application in response to a fourth trigger operation for the second game interface, and in the process of switching the displayed game interface from the second game interface to the third game interface, maintaining a location of the target screen unchanged, and continuing to display the game live-streaming screen in the target screen.

In this embodiment, the fourth trigger operation may include, but is not limited to, being the same as or different from the first trigger operation, the second trigger operation, and the third trigger operation; may include, but is not limited to, click/tap, press/hold, slide, release, double-click/tap, and other trigger operations; or may include, but is not limited to, a trigger operation implemented in a manner of a gesture, voice, or an action.

Figure 8:
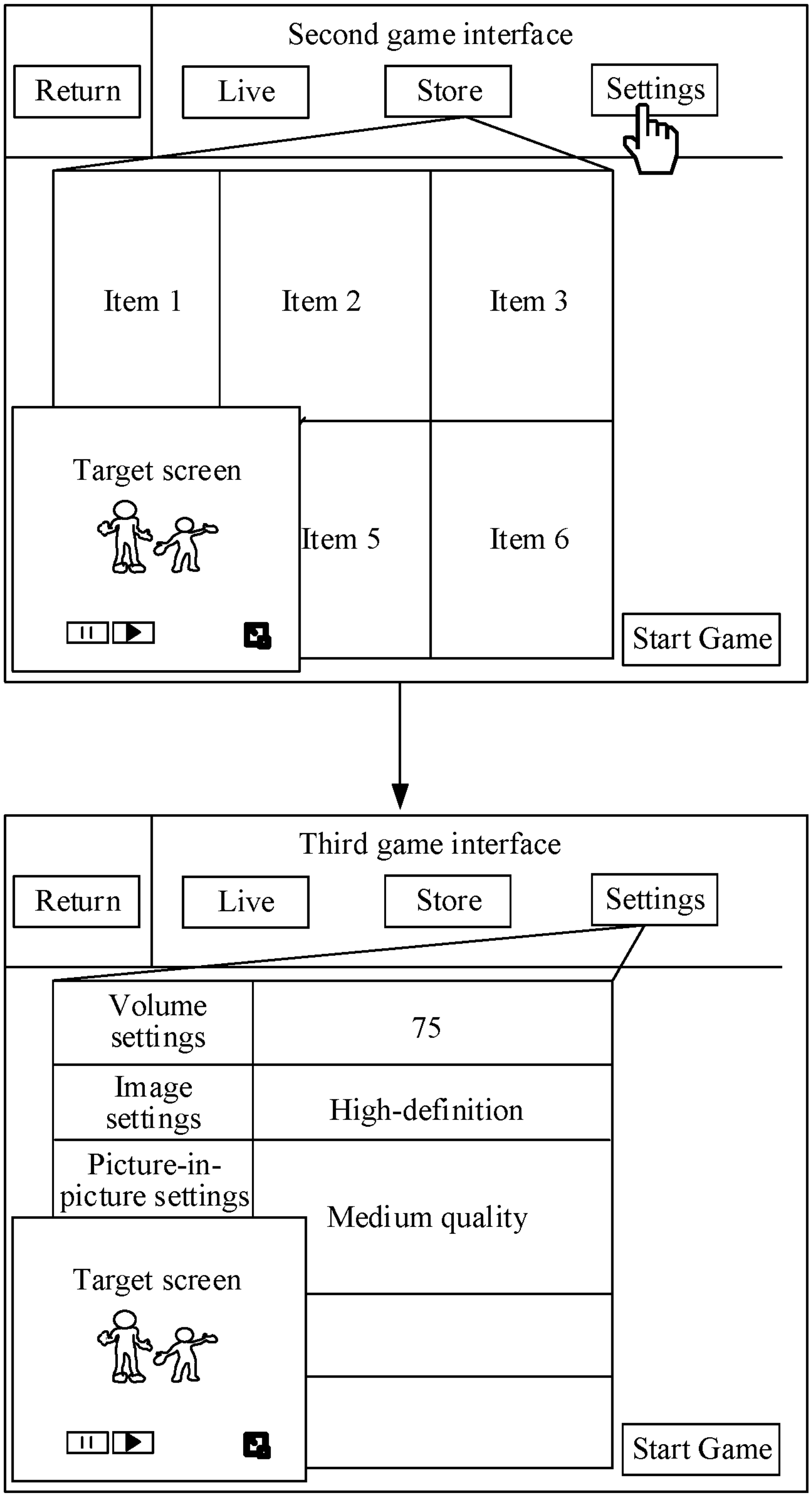
FIG. 8 is a schematic diagram of another interaction method for game live-streaming according to an embodiment of this disclosure.

For example, FIG. 8 is a schematic diagram of another interaction method for game live-streaming according to an embodiment of this disclosure. As shown in FIG. 8, a game store screen and a target screen are currently displayed in the second game interface, the second game interface being a game interface associated with a "store" function. A fourth trigger operation is performed on a touch button "Settings" to switch the second game interface to a third game interface, the third game interface being a game interface corresponding to the touch button "Settings". In addition, a location of the target screen remains unchanged, and the game live-streaming screen continues to be displayed in the target screen.

In a solution, the switching a displayed game interface from the second game interface to a third game interface of the target game application in response to a fourth trigger operation for the second game interface includes: in a case that the fourth trigger operation is used for triggering start of a game, switching the displayed game interface from the second game interface to a start interface of the game in response to the fourth trigger operation for the second game interface, the third game interface being the start interface of the game.

The method further includes: displaying a fourth game interface after the game is started, displaying a game screen of the game in the fourth game interface, and continuing to display the game live-streaming screen in the target screen.

In this embodiment, that the fourth trigger operation is used for triggering start of a game may include, but is not limited to, performing a touch interactive operation on a touch button for starting a game in the second game interface, to switch the displayed game interface from the second game interface to the start interface of the game in response to the fourth trigger operation for the second game interface.

Figure 9:
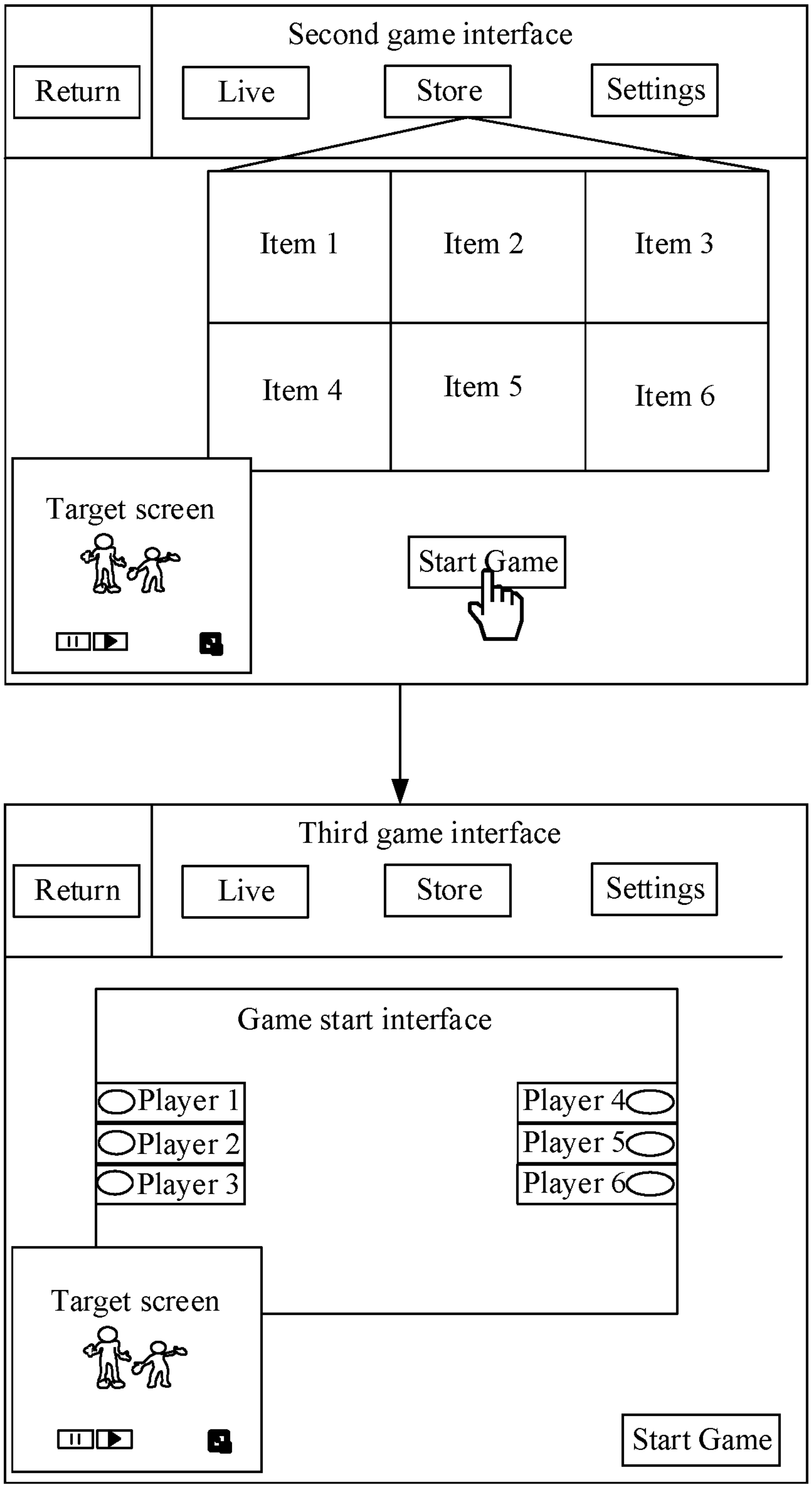
FIG. 9 is a schematic diagram of another interaction method for game live-streaming according to an embodiment of this disclosure.

For example, FIG. 9 is a schematic diagram of another interaction method for game live-streaming according to an embodiment of this disclosure. As shown in FIG. 9, a game store screen and a target screen are currently displayed in the second game interface, the second game interface being a game interface associated with a "store" function. A fourth trigger operation is performed on a touch button "Start Game" to switch the second game interface to a third game interface, the third game interface being a start interface of a game that corresponds to the touch button "Start Game". In addition, a location of the target screen remains unchanged, and the game live-streaming screen continues to be displayed in the target screen.

In this embodiment, the fourth trigger operation is used for displaying a fourth game interface corresponding to an ongoing game after the game starts. A game screen of the game is displayed in the fourth game interface, and the game live-streaming screen continues to be displayed in the target screen.

Figure 10:
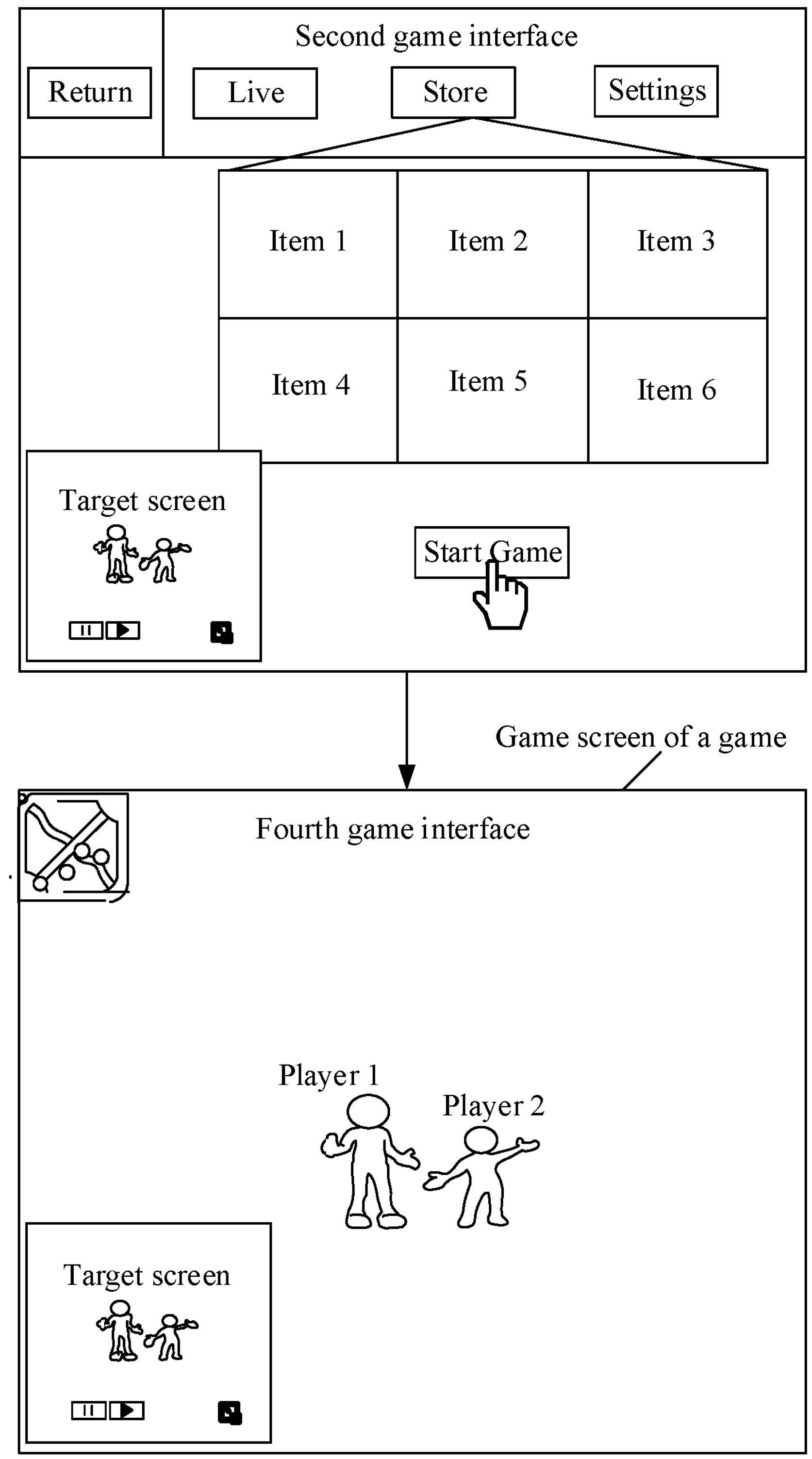
FIG. 10 is a schematic diagram of another interaction method for game live-streaming according to an embodiment of this disclosure.

For example, FIG. 10 is a schematic diagram of another interaction method for game live-streaming according to an embodiment of this disclosure. As shown in FIG. 10, a game store screen and a target screen are currently displayed in the second game interface, the second game interface being a game interface associated with a "store" function. A fourth trigger operation is performed on a touch button "Start Game" to switch the second game interface to a third game interface, the third game interface being a game screen of a game that corresponds to the touch button "Start Game". In addition, a location of the target screen remains unchanged, and the game live-streaming screen continues to be displayed in the target screen.

In this embodiment, that the fourth trigger operation is used for triggering start of a game may include, but is not limited to, performing a touch interactive operation on a touch button for starting a game in the second game interface, to switch the displayed game interface from the second game interface to the start interface of the game in response to the fourth trigger operation for the second game interface.

In a solution, the foregoing method further includes:

during the display of the third game interface, generating and displaying a fourth game interface in the target game application in response to a set of trigger operations obtained from the target game application, displaying a game screen of a started game in the fourth game interface, and continuing to display the game live-streaming screen in the target screen, the set of trigger operations being used for triggering start of the game.

In this embodiment, the set of trigger operations may include, but are not limited to, switching from another interface to a start interface of a game, then switching from the start interface of the game to a game interface of the game, and continuing to display the game live-streaming screen in the target screen.

Figure 11:
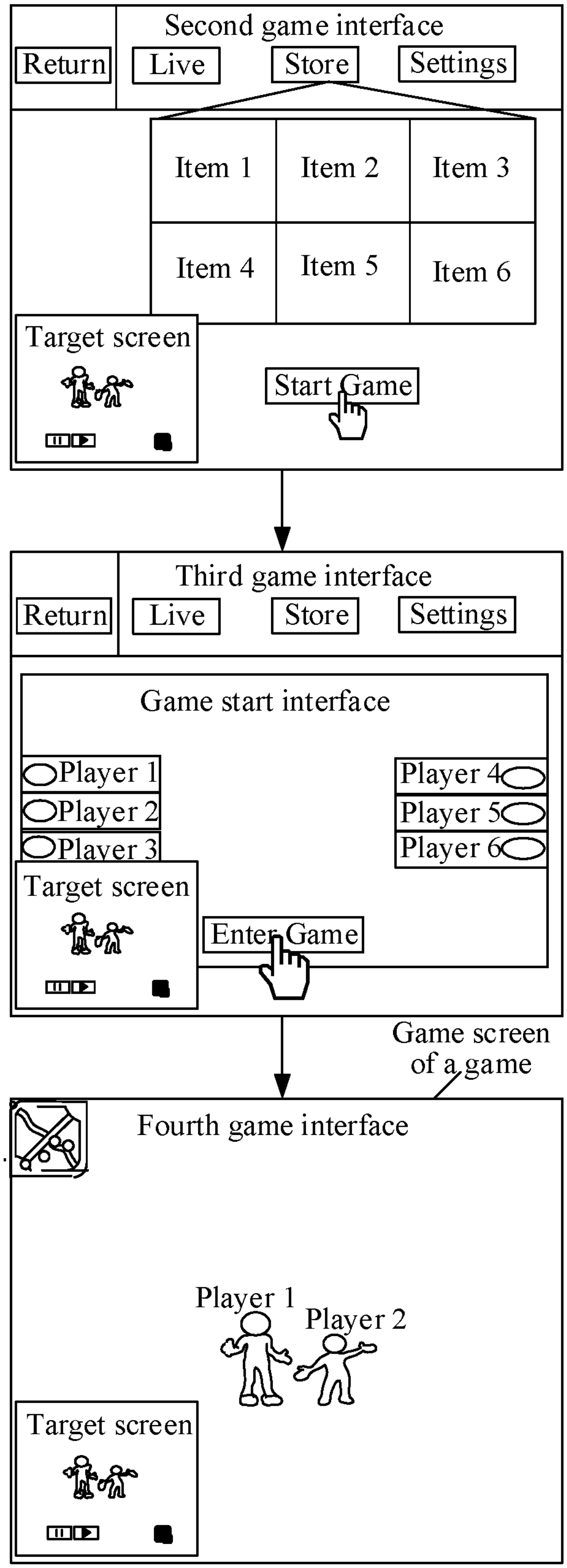
FIG. 11 is a schematic diagram of another interaction method for game live-streaming according to an embodiment of this disclosure.

For example, FIG. 11 is a schematic diagram of another interaction method for game live-streaming according to an embodiment of this disclosure. As shown in FIG. 11, a game store screen and a target screen are currently displayed in the second game interface, the second game interface being a game interface associated with a "store" function. A trigger operation is performed on a touch button "Start Game" to switch the second game interface to a third game interface, the third game interface being a start interface of a game that corresponds to the touch button "Start Game". In addition, a location of the target screen remains unchanged, and the game live-streaming screen continues to be displayed in the target screen. In this case, the start interface of the game and the target screen are displayed in the third game interface. The trigger operation is performed on a touch button "Enter Game", to switch the third game interface to a fourth game interface. In addition, the location of the target screen remains unchanged, and the game live-streaming screen continues to be displayed in the target screen. The trigger operation performed on the touch button "Start Game" and the trigger operation performed on the touch button "Enter Game" constitute the foregoing set of trigger operations.

The foregoing description is only an example and there is no specific limitations in this embodiment.

In a solution, the generating and displaying the target screen includes:

in a case that obtaining system permissions of a floating window in the terminal device is skipped, creating a native picture-in-picture view, and adding the picture-in-picture view to a target view created by a game engine of the target game application, the first game interface being displayed in the target view;

creating a view of a native player, and adding the view of the native player to the picture-in-picture view, the target screen being the picture-in-picture view; and displaying the game live-streaming screen in the picture-in-picture view.

In this embodiment, the native picture-in-picture view may include, but is not limited to, a picture-in-picture view created by a picture-in-picture module invoked from the terminal device in which the target game application is installed. The adding the picture-in-picture view to a target view created by a game engine of the target game application may include, but is not limited to, adding a display location of the picture-in-picture view on the target view created by the game engine of the target game application. In other words, the picture-in-picture view corresponds to a layer 1, the target view created by the game engine of the target game application corresponds to a layer 2, and the layer 1 is on top of the layer 2.

In this embodiment, the view of the native player may include, but is not limited to, a player view created by a player module invoked from the terminal device in which the target game application is installed. The adding the view of the native player to the picture-in-picture view is equivalent to a case that the picture-in-picture view corresponds to a layer 1, the target view created by the game engine of the target game application corresponds to a layer 2, the layer 1 is on top of the layer 2, and the view of the native player is a sublayer 1 of the layer 1 and is displayed in the layer 1.

In a solution, the creating a view of a native player, and adding the view of the native player to the picture-in-picture view includes:

calling a native multimedia component through the game engine to create the view of the native player, and adding the view of the native player to the picture-in-picture view, the native player being encapsulated in the multimedia component.

In this embodiment, the multimedia component may include, but is not limited to, a native multimedia component of the terminal device in which the target game application is installed. The native player may include, but is not limited to, a native player of the terminal device in which the target game application is installed.

In a solution, the method further includes:

creating a view of a player control component, and overlaying the view of the player control component on the view of the native player in the picture-in-picture view, the player control component being used for controlling playing of the displayed game live-streaming screen.

In this embodiment, the multimedia component may include, but is not limited to, a component view created by a multimedia component module invoked from the terminal device in which the target game application is installed. The calling a native multimedia component through the game engine to create the view of the native player, and adding the view of the native player to the picture-in-picture view is equivalent to a case that the picture-in-picture view corresponds to a layer 1, the target view created by the game engine of the target game application corresponds to a layer 2, the layer 1 is on top of the layer 2, the view of the native player is a sublayer 1 of the layer 1, and the multimedia component view is a sublayer 2 of the layer 1 and is displayed on top of the sublayer 1 in the layer 1.

In a solution, the creating a view of a player control component, and overlaying the view of the player control component on the view of the native player in the picture-in-picture view includes:

calling a native multimedia component through the game engine to create the view of the player control component, and overlaying the view of the player control component on the view of the native player in the picture-in-picture view, the native player and the player control component being encapsulated in the multimedia component.

In this embodiment, the multimedia component may include, but is not limited to, a native multimedia component of the terminal device in which the target game application is installed. The player control component may include, but is not limited to, a player control component of the terminal device in which the target game application is installed.

In a solution, the method further includes:

initializing a picture-in-picture function module in the target game application, and transmitting a target request to a background device of the target game application;

obtaining a picture-in-picture function switch configuration transmitted by the background device in response to the target request, the picture-in-picture function switch configuration being used for presenting and disabling a picture-in-picture function entry in the target game application, and the picture-in-picture function entry being used for displaying the target screen; and displaying the picture-in-picture function entry in the target game application in a case that the picture-in-picture function switch configuration is set to presenting the picture-in-picture function entry.

In this embodiment, the entry may be preconfigured by a developer to determine, by adjusting a parameter of the function entry, whether to display the picture-in-picture function entry in the terminal device.

A solution includes:

generating and displaying a game matching interface and a target screen in a first game interface of a target game application, the target screen being located in a target region of the game matching interface, and displaying a game live-streaming screen of the target game application in the target screen; and canceling the display of the target screen in response to a first trigger operation for the target screen. For example, the method includes generating and displaying, on a terminal device, a game match interface and a live-streaming screen in a first game interface of a game application, the live-streaming screen being located in a first region of the game match interface. The method also includes canceling the display of the live-streaming screen in response to a first trigger operation associated with the live-streaming screen.

In this embodiment, the game matching interface may include, but is not limited to, a game screen corresponding to a currently ongoing game.

Figure 12:
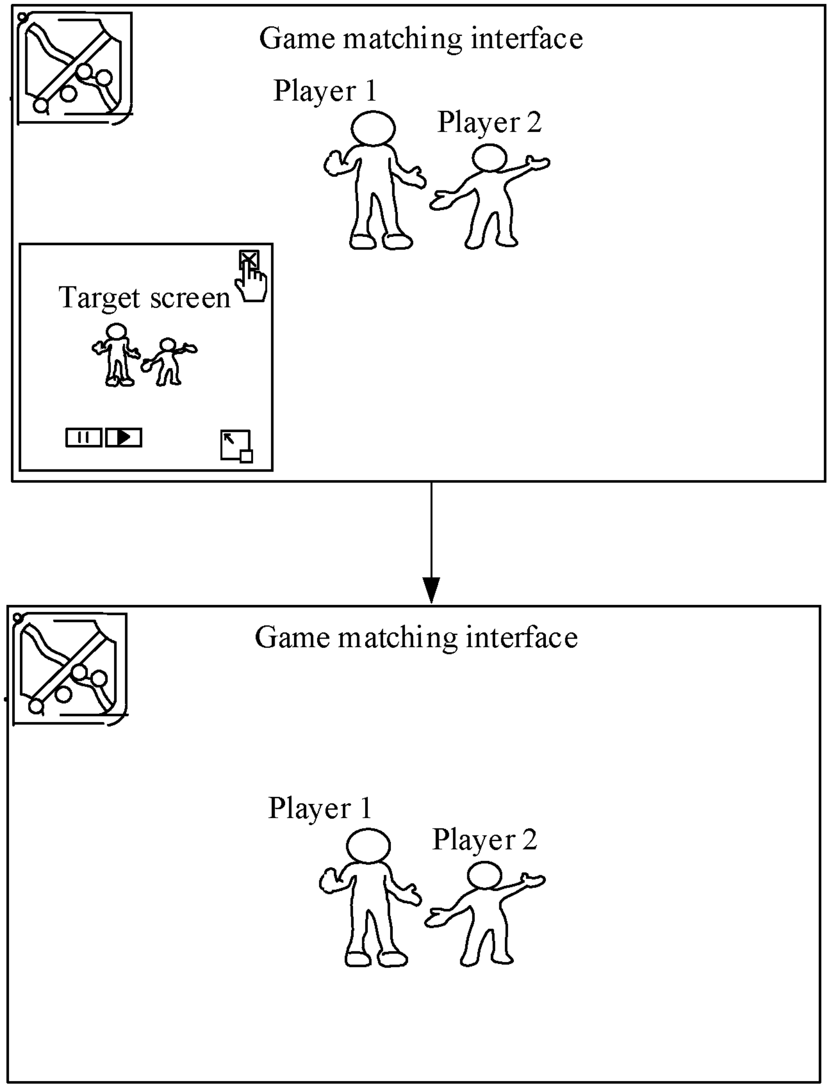
FIG. 12 is a schematic diagram of another interaction method for game live-streaming according to an embodiment of this disclosure.

For example, FIG. 12 is a schematic diagram of another interaction method for game live-streaming according to an embodiment of this disclosure. As shown in FIG. 12, a game being played between a player 1 and a player 2 is currently displayed in the game matching interface. A trigger operation is performed on a touch button "Close" to cancel the display of the target screen.

In a solution, the generating and displaying a game matching interface and a target screen in a first game interface of a target game application includes at least one of the following:

- generating and displaying the target screen in response to a second trigger operation for a first control in the first game interface in a case that the game matching interface is displayed in the first game interface; and
- generating and displaying the target screen in response to a third trigger operation for a list of game characters in the first game interface in a case that the game matching interface is displayed in the first game interface, the third trigger operation being used for selecting a target game character in the list of game characters, and the game live-streaming screen displayed in the target screen being a game live-streaming screen related to the target game character.

In this embodiment, the second trigger operation may include, but is not limited to, being the same as or different from the first trigger operation. The target screen is displayed in response to the second trigger operation for the first control in the first game interface in a case that the game matching interface is displayed in the first game interface.

Figure 13:
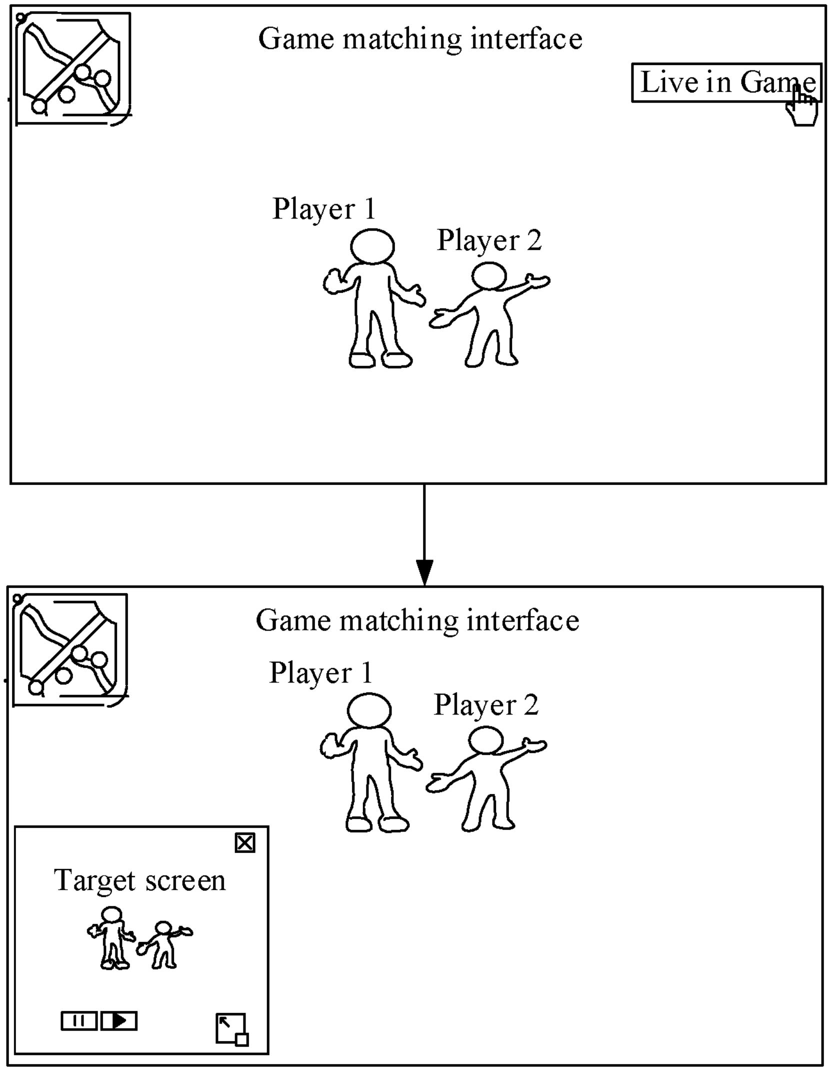
FIG. 13 is a schematic diagram of another interaction method for game live-streaming according to an embodiment of this disclosure.

For example, FIG. 13 is a schematic diagram of another interaction method for game live-streaming according to an embodiment of this disclosure. As shown in FIG. 13, a game being played between a player 1 and a player 2 is currently displayed in the game matching interface. A trigger operation is performed on a touch button "Live in Game" to display the target screen.

In this embodiment, the third trigger operation may include, but is not limited to, being the same as or different from the first trigger operation. The target game character in the list of game characters is selected in response to the third trigger operation for the list of game characters in the first game interface in a case that the game matching interface is displayed in the first game interface, to display the game live-streaming screen related to the target game character in the target screen.

Figure 14:
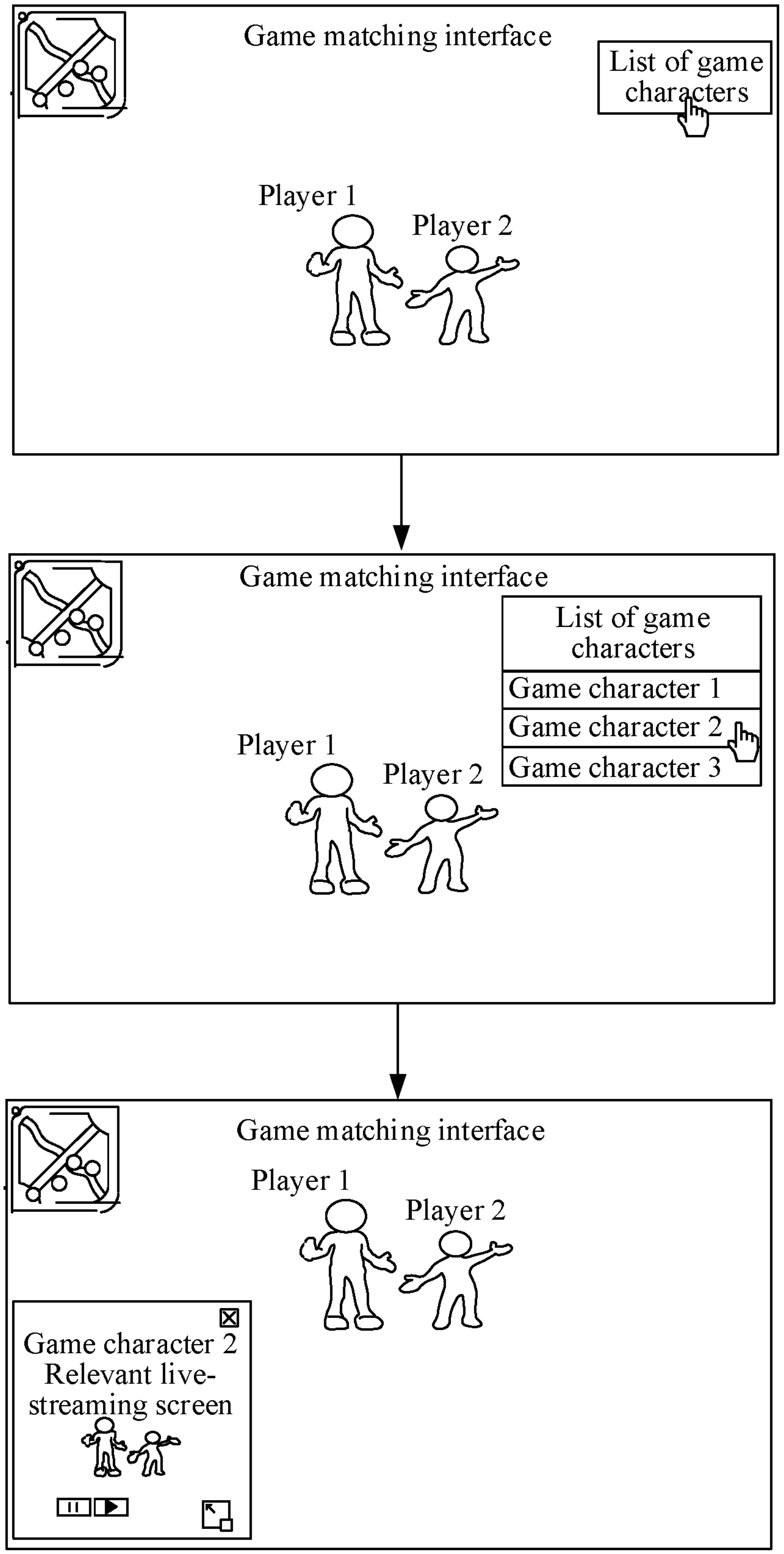
FIG. 14 is a schematic diagram of another interaction method for game live-streaming according to an embodiment of this disclosure.

For example, FIG. 14 is a schematic diagram of another interaction method for game live-streaming according to an embodiment of this disclosure. As shown in FIG. 14, a game being played between a player 1 and a player 2 is currently displayed in the game matching interface. A trigger operation is performed on a touch button "List of game characters" to display a drop-down menu, and then a trigger operation is performed on "Game character 2" displayed in the drop-down menu to display a target screen associated with the game character 2.

In a solution, the generating and displaying the target screen in response to a third trigger operation for a list of game characters in the first game interface includes:

- generating and displaying the target screen in response to the third trigger operation, and displaying, in the target screen, a game live-streaming screen of a game in which the target game character participates; or
- generating and displaying the target screen in response to the third trigger operation, and displaying the game live-streaming screen related to the target game character in the target screen, the game live-streaming screen being used for introducing related information of the target game character.

In this embodiment, the target game character may include, but is not limited to, a game character controlled by a user. In some game applications, the target game character may be displayed by displaying an avatar in the game matching interface. The target screen may be displayed by performing the third trigger operation on the target game character, and the game live-streaming screen of the game in which the target game character participates is displayed in the target screen. The target screen is displayed in response to the third trigger operation, and the game live-streaming screen related to the target game character is displayed in the target screen. The game live-streaming screen is used for introducing related information of the target game character. The related information includes usage tips of the target game character, and the like.

Figure 15:
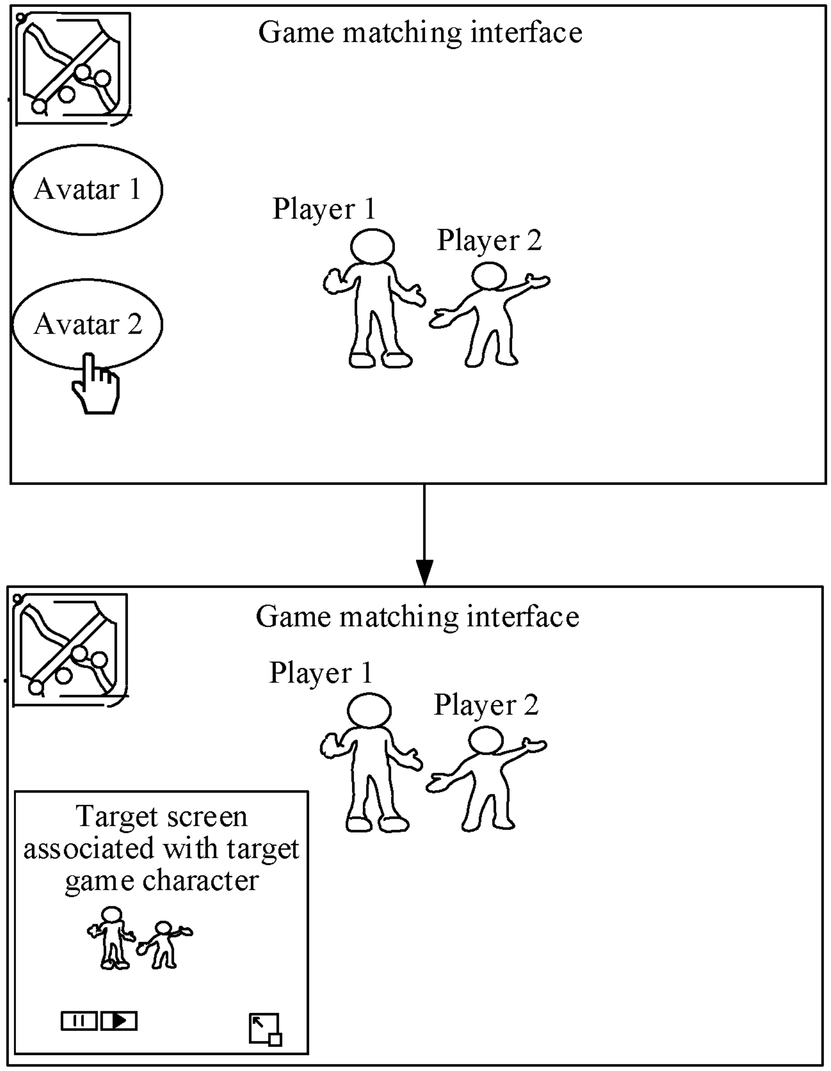
FIG. 15 is a schematic diagram of another interaction method for game live-streaming according to an embodiment of this disclosure.

For example, FIG. 15 is a schematic diagram of another interaction method for game live-streaming according to an embodiment of this disclosure. As shown in FIG. 15, a game being played between a player 1 and a player 2 is currently displayed in the game matching interface. A trigger operation is performed on a touch button "Avatar 2" to select a game character corresponding to the avatar 2 as the target game character, and a target screen associated with the target game character corresponding to the avatar 2 is displayed.

In a solution, the method further includes:

- generating and displaying game information of a target game character in the game live-streaming screen in response to a fourth trigger operation for a second control in a case that the game matching interface and the target screen are displayed in the first game interface, the game information of the target game character including one of the following: item builds information of the target game character, usage tips information of the target game character, or information about a recommended range of movement of the target game character.

In this embodiment, the item builds information of the target game character may include, but is not limited to, a game equipment usage method recommended by a system for a player according to big data. The usage tips information of the target game character may include, but is not limited to, game character usage tips recommended by the system for a player according to big data. The information about a recommended range of movement of the target game character may include, but is not limited to, a recommended range of movement of a game character recommended by the system for a player according to big data.

Figure 16:
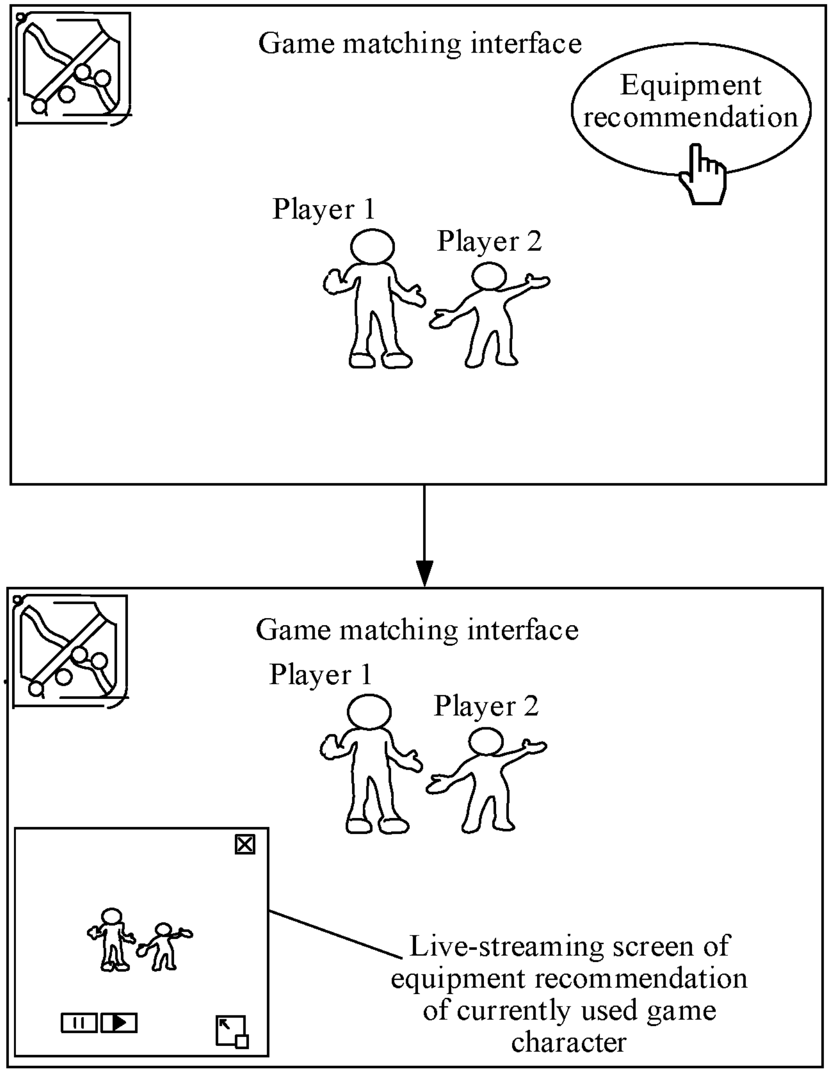
FIG. 16 is a schematic diagram of another interaction method for game live-streaming according to an embodiment of this disclosure.

For example, FIG. 16 is a schematic diagram of another interaction method for game live-streaming according to an embodiment of this disclosure. As shown in FIG. 16, a game being played between a player 1 and a player 2 is currently displayed in the game matching interface. A trigger operation is performed on a touch button "Equipment recommendation" to display a live-streaming screen of equipment recommendation associated with a target game character currently controlled by a user.

In a solution, the generating and displaying a game matching interface and a target screen in a first game interface of a target game application includes:

- generating and displaying the target screen in response to a fifth trigger operation for a third control in the first game interface in a case that a target game character dies, the target game character being a game character controlled by a target account, and the target account being a login account of the target game application; or generating and displaying the target screen in response to the fifth trigger operation for the third control in the first game interface in a case that the target game character is idle.

In this embodiment, that a target game character dies may include, but is not limited to, a case that a value of virtual health points of the target game character is 0 or a predetermined threshold. The fifth trigger operation is the same as or different from the first trigger operation, the second trigger operation, the third trigger operation, and the fourth trigger operation.

After a target game character controlled by a user dies, usually only a game screen of another player of the current game can be watched, and a live-streaming screen cannot be watched during a waiting time for resurrection. In this embodiment, in terms of the displaying the target screen in response to a fifth trigger operation for a third control in the first game interface in a case that a target game character dies, the target screen is displayed in response to the fifth trigger operation.

When a target game character controlled by a user is idle, the user usually cannot perform any other operation, but only waits for another game event to be triggered, and cannot watch a live-streaming screen during the idle time. In this embodiment, the target screen is displayed in response to the fifth trigger operation for the third control in the first game interface in a case that the target game character is idle.

Figure 17:
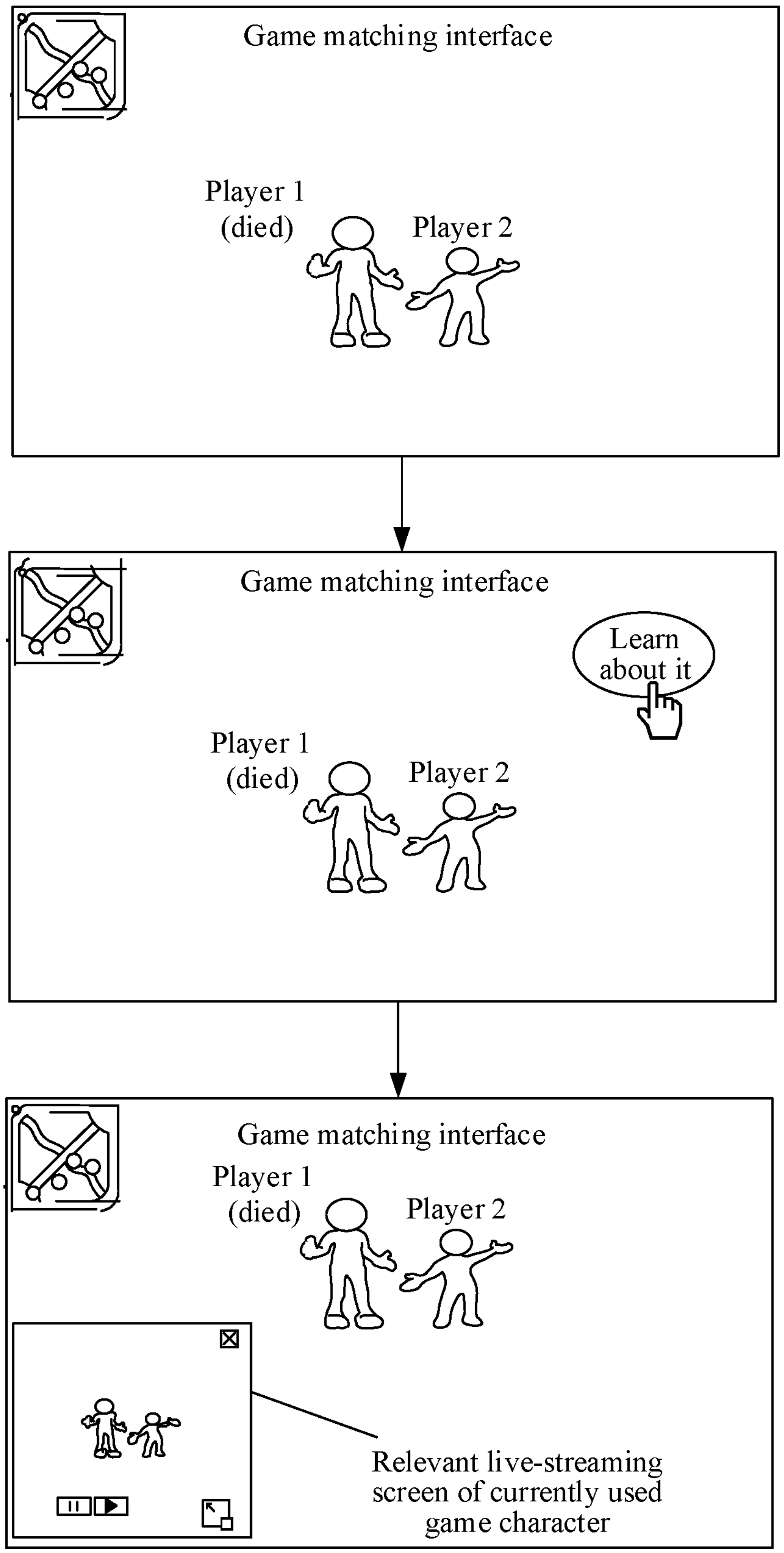
FIG. 17 is a schematic diagram of another interaction method for game live-streaming according to an embodiment of this disclosure.

For example, FIG. 17 is a schematic diagram of another interaction method for game live-streaming according to an embodiment of this disclosure. As shown in FIG. 17, a game being played between a player 1 (died) and a player 2 is currently displayed in the game matching interface. A trigger operation is performed on a touch button "Learn about it" to display a live-streaming screen associated with a target game character currently controlled by a user.

This embodiment is further explained below with reference to specific examples:

In the related art, a picture-in-picture function is usually implemented by using a system floating window. The floating window is a system tool of a mobile terminal. A movable window floats on a surface of another application to open different applications. However, to use a floating window, the mobile terminal requires system authorization.

However, through this embodiment, a game match or a game host live streaming is watched during a game through picture-in-picture, so that game playing and match watching can be performed at the same time. The picture-in-picture is mainly implemented by calling a native multimedia component through a Unity engine. The multimedia component is a carrier for playing a live stream, encapsulates a native player, a player control component, and a touch event inside, and is bound to a View created by the Unity engine, without applying for additional permissions. In other words, in this embodiment of this disclosure, a user can avoid an operation of obtaining system authorization for a floating window (that is, system authorization for picture-in-picture) of a terminal device (for example, a mobile terminal), but call a native multimedia component through a Unity engine to play a live-streaming screen while performing a game operation. This can avoid complex operations of system authorization operations, thereby improving convenience of interaction.

Figure 18:
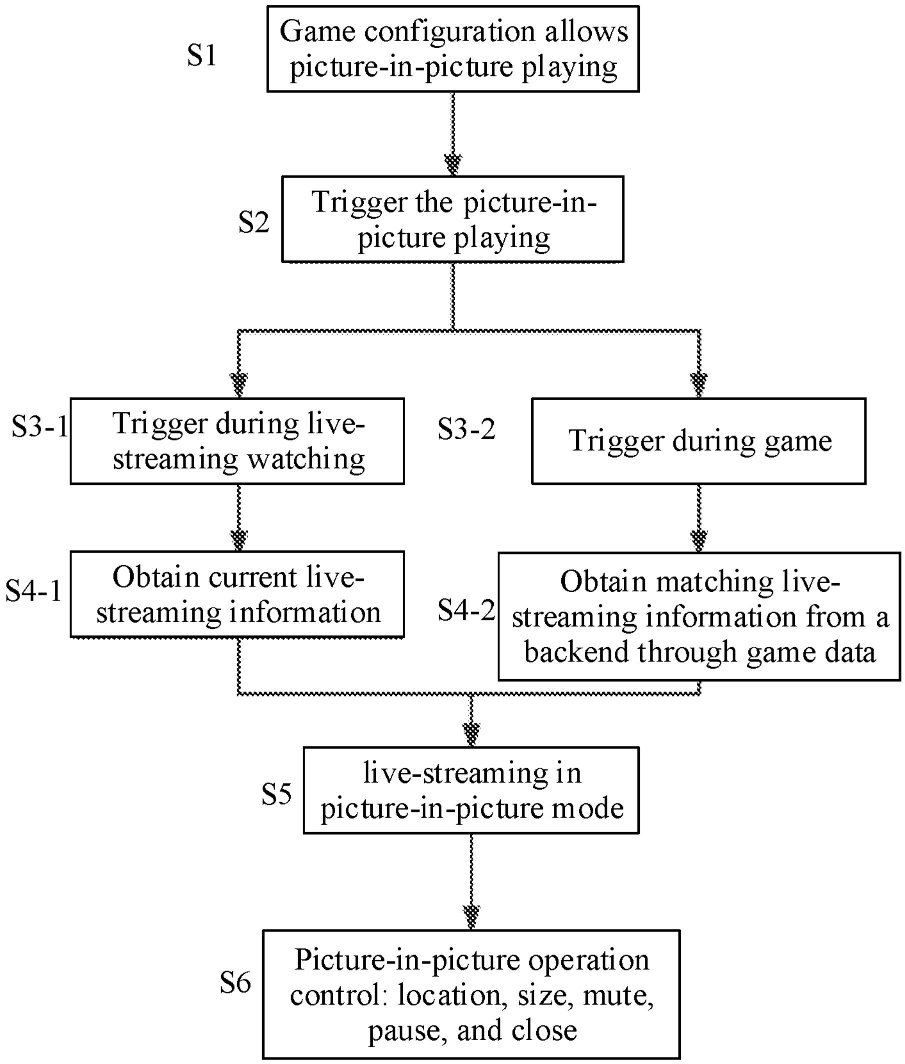
FIG. 18 is a schematic diagram of another interaction method for game live-streaming according to an embodiment of this disclosure.

For example, FIG. 18 is a schematic diagram of another interaction method for game live-streaming according to an embodiment of this disclosure. As shown in FIG. 18, the method may include, but is not limited to, the following procedure:

(1) Initialize a picture-in-picture function module, and a client sends an HTTP request to a backend (i.e., a backend device) to obtain a picture-in-picture function switch configuration.

(2) Present a picture-in-picture function entry when the picture-in-picture function switch configuration is enabled.

(3) When a user triggers a picture-in-picture function, the client sends the HTTP request to the backend to obtain a latest play address.

(4) Enable a picture-in-picture component in a game interface, a player module in the component being initialized.

(5) The picture-in-picture component plays a corresponding live stream according to an incoming live-streaming sitelink.

(6) The picture-in-picture component can monitor a touch event of the user during playing to implement location, size, pause, and close operations.

Figure 19:
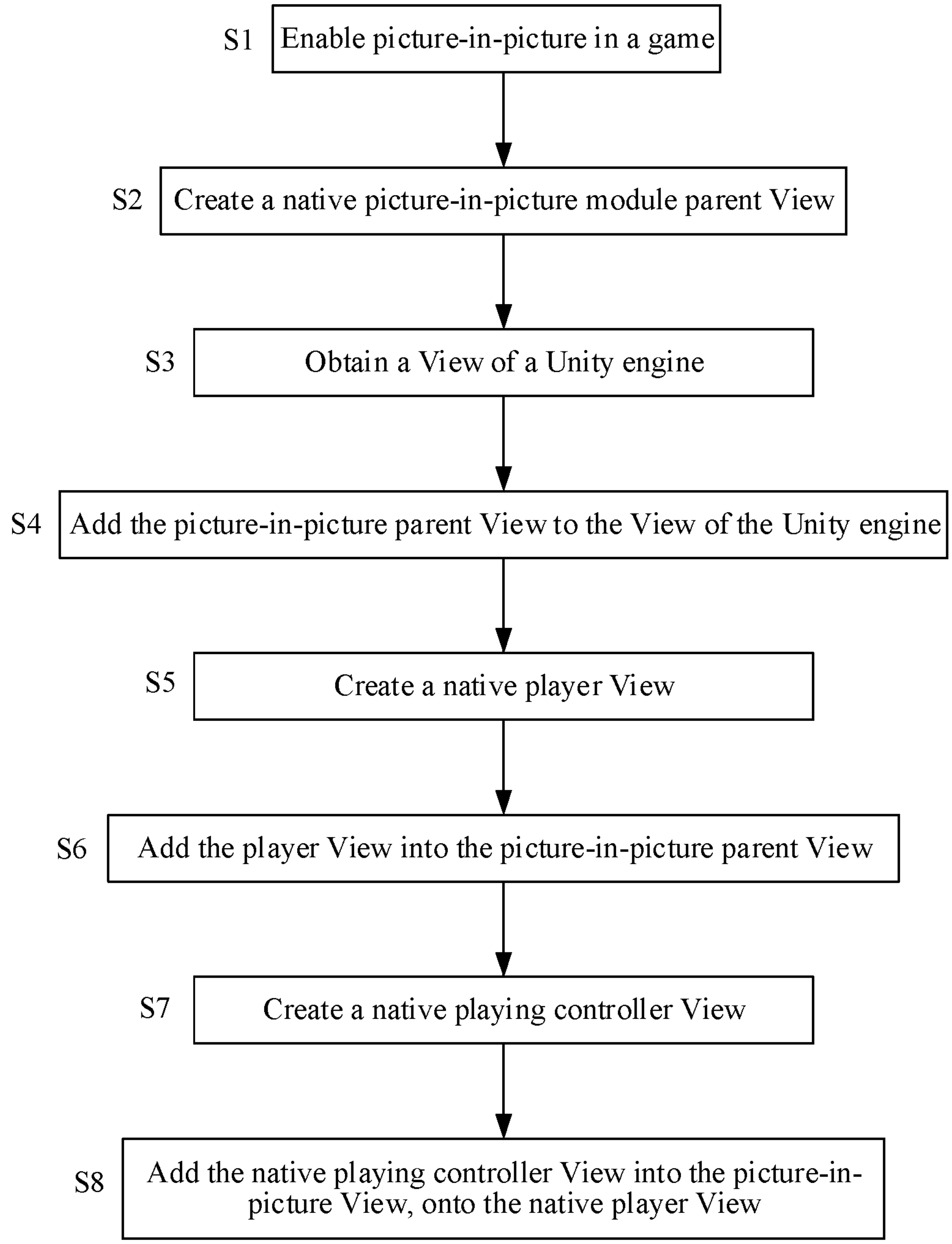
FIG. 19 is a schematic diagram of another interaction method for game live-streaming according to an embodiment of this disclosure.

Specifically, for example, FIG. 19 is a schematic diagram of another interaction method for game live-streaming according to an embodiment of this disclosure. As shown in FIG. 19, a picture-in-picture component is created in the following manner:

(1) Create a native picture-in-picture parent View, and add the picture-in-picture parent View to a View of a Unity engine.

(2) Create a native player View, and add the player View to the picture-in-picture parent View.

(3) A player View starts playing of a live-streaming sitelink.

(4) Create a player control View, and overlay the player control View on the player View.

(5) A user can control the View through a player to perform pause, return, close, move, and other operations.

Through this embodiment, a live stream can be watched during a game, so that fragmented time of the game can be effectively used. In addition, because the game and the live-streaming in the game both occupy game duration, a player can have a richer game experience within a limited time.

For ease of description, the foregoing method embodiments are stated as a combination of a series of actions. However, a person skilled in the art is to know that this disclosure is not limited by the described action sequence, because according to this disclosure, some steps may be performed in another sequence or simultaneously. In addition, a person skilled in the art is further to understand that the embodiments described in this specification are all exemplary embodiments, and the involved actions and modules are not necessarily required by this disclosure.

Figure 20:
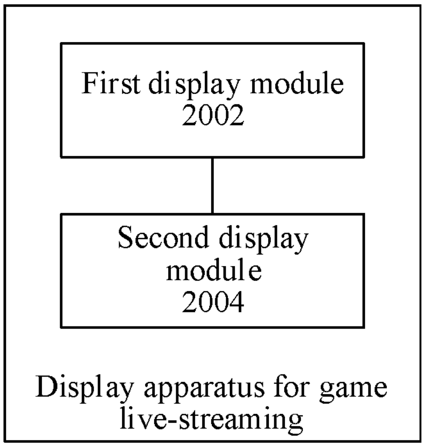
FIG. 20 is a schematic structural diagram of a display apparatus for game live-streaming according to an embodiment of this disclosure.

According to another aspect of the embodiments of this disclosure, a display apparatus for game live-streaming, configured to implement the foregoing interaction method for game live-streaming, is further provided. As shown in FIG. 20, the apparatus includes:

According to another aspect of the embodiments of this disclosure, a display apparatus for game live-streaming is further provided, including:

a first display module 2002, configured to display a first game interface of a target game application, the first game interface including a game live-streaming screen of the target game application; and a second display module 2004, configured to generate and display a second game interface and a target screen of the target game application in response to a first trigger operation for the game live-streaming screen, and display the game live-streaming screen in the target screen, the target screen being located in a first region of the second game interface.

In a solution, the apparatus is further configured to: hide the target screen in response to a second trigger operation for the target screen during the display of the target screen; and display the target screen in response to a third trigger operation for the target screen in a case that the target screen is in a hidden state.

In a solution, the apparatus is configured to hide, in the following manner, the target screen in response to the second trigger operation for the target screen during the display of the target screen: hiding the target screen in response to a first slide operation for the target screen during the display of the target screen.

The apparatus is configured to display, in the following manner, the target screen in response to the third trigger operation for the target screen in a case that the target screen is in the hidden state: displaying the target screen in response to a second slide operation for the target screen in a case that the target screen is in the hidden state, a slide direction of the first slide operation being opposite to a slide direction of the second slide operation.

In a solution, the apparatus is configured to generate and display, in one of the following manners, the second game interface and the target screen of the target game application in response to the first trigger operation for the game live-streaming screen:

generating and displaying the second game interface and the target screen of the target game application in response to a touch interactive operation for the game live-streaming screen;

generating and displaying the second game interface and the target screen of the target game application in response to a gesture operation for the game live-streaming screen;

generating and displaying the second game interface and the target screen of the target game application in response to a voice interaction operation for the game live-streaming screen; or generating and displaying the second game interface and the target screen of the target game application in response to a mouse control operation for the game live-streaming screen.

In a solution, the apparatus is configured to generate and display, in the following manner, the second game interface and the target screen of the target game application in response to the first trigger operation for the game live-streaming screen:

switching a displayed game interface from the first game interface to a previous game interface before entry of the first game interface in response to the first trigger operation, and displaying the target screen, the second game interface being the previous game interface; or switching a displayed game interface from the first game interface to a game lobby interface of the target game application in response to the first trigger operation, and displaying the target screen, the second game interface being the game lobby interface.

In a solution, the apparatus is further configured to:

switch a displayed game interface from the second game interface to a third game interface of the target game application in response to a fourth trigger operation for the second game interface, and in the process of switching the displayed game interface from the second game interface to the third game interface, maintain a location of the target screen unchanged, and continue to display the game live-streaming screen in the target screen.

In a solution, the apparatus is configured to switch, in the following manner, the displayed game interface from the second game interface to the third game interface of the target game application in response to the fourth trigger operation for the second game interface: in a case that the fourth trigger operation is used for triggering start of a game, switching the displayed game interface from the second game interface to a start interface of the game in response to the fourth trigger operation for the second game interface, the third game interface being the start interface of the game.

The apparatus is further configured to: display a fourth game interface after the game is started, display a game screen of the game in the fourth game interface, and continue to display the game live-streaming screen in the target screen.

In a solution, the apparatus is further configured to:

during the display of the third game interface, generate and display a fourth game interface in the target game application in response to a set of trigger operations obtained from the target game application, display a game screen of a started game in the fourth game interface, and continue to display the game live-streaming screen in the target screen, the set of trigger operations being used for triggering start of the game.

In a solution, the apparatus is configured to display the target screen in the following manner:

creating a native picture-in-picture view, and adding the picture-in-picture view to a target view created by a game engine of the target game application, the first game interface being displayed in the target view;

creating a view of a native player, and adding the view of the native player to the picture-in-picture view, the target screen being the picture-in-picture view; and displaying the game live-streaming screen in the picture-in-picture view.

In a solution, the apparatus is configured to: in the following manner, create the view of the native player, and add the view of the native player to the picture-in-picture view:

calling a native multimedia component through the game engine to create the view of the native player, and adding the view of the native player to the picture-in-picture view, the native player being encapsulated in the multimedia component.

In a solution, the apparatus is further configured to:

create a view of a player control component, and overlay the view of the player control component on the view of the native player in the picture-in-picture view, the player control component being used for controlling playing of the displayed game live-streaming screen.

In a solution, the apparatus is configured to: in the following manner, create the view of the player control component, and overlay the view of the player control component on the view of the native player in the picture-in-picture view:

calling a native multimedia component through the game engine to create the view of the player control component, and overlaying the view of the player control component on the view of the native player in the picture-in-picture view, the native player and the player control component being encapsulated in the multimedia component.

In a solution, the apparatus is further configured to:

initialize a picture-in-picture function module in the target game application, and transmit a target request to a background device of the target game application;

obtain a picture-in-picture function switch configuration transmitted by the background device in response to the target request, the picture-in-picture function switch configuration being used for presenting and disabling a picture-in-picture function entry in the target game application, and the picture-in-picture function entry being used for displaying the target screen; and display the picture-in-picture function entry in the target game application in a case that the picture-in-picture function switch configuration is set to presenting the picture-in-picture function entry.

According to another aspect of the embodiments of this disclosure, a display apparatus for game live-streaming, configured to implement the foregoing interaction method for game live-streaming, is further provided. The apparatus includes:

a third display module, configured to generate and display a game matching interface and a target screen in a first game interface of a target game application, the target screen being located in a target region of the game matching interface, and display a game live-streaming screen of the target game application in the target screen; and a processing module, configured to cancel the display of the target screen in response to a first trigger operation for the target screen.

In a solution, the apparatus is configured to generate and display the game matching interface and the target screen in the first game interface of the target game application in one of the following manners:

generating and displaying the target screen in response to a second trigger operation for a first control in the first game interface in a case that the game matching interface is displayed in the first game interface; and generating and displaying the target screen in response to a third trigger operation for a list of game characters in the first game interface in a case that the game matching interface is displayed in the first game interface, the third trigger operation being used for selecting a target game character in the list of game characters, and the game live-streaming screen displayed in the target screen being a game live-streaming screen related to the target game character.

In a solution, the apparatus is configured to display the target screen in response to the third trigger operation for the list of game characters in the first game interface in the following manner:

generating and displaying the target screen in response to the third trigger operation, and displaying, in the target screen, a game live-streaming screen of a game in which the target game character participates; or generating and displaying the target screen in response to the third trigger operation, and displaying the game live-streaming screen related to the target game character in the target screen, the game live-streaming screen being used for introducing related information of the target game character.

In a solution, the apparatus is further configured to:

generate and display game information of a target game character in the game live-streaming screen in response to a fourth trigger operation for a second control in a case that the game matching interface and the target screen are displayed in the first game interface, the game information of the target game character including one of the following: item builds information of the target game character, usage tips information of the target game character, or information about a recommended range of movement of the target game character.

In a solution, the apparatus is configured to generate and display the game matching interface and the target screen in the first game interface of the target game application in the following manner:

generating and displaying the target screen in response to a fifth trigger operation for a third control in the first game interface in a case that a target game character dies, the target game character being a game character controlled by a target account, and the target account being a login account of the target game application; or generating and displaying the target screen in response to the fifth trigger operation for the third control in the first game interface in a case that the target game character is idle.

According to one aspect of this disclosure, a computer program product is provided, including a computer program/instruction, the computer program/instruction including program code used for performing the methods shown in the flowcharts. In such an embodiment, the computer program may be downloaded from a network and installed through a communication part 2109, and/or may be installed from a removable medium 2111. When the computer program is executed by a central processing unit (CPU) 2101, various functions provided in the embodiments of this disclosure are performed.

The sequence numbers of the foregoing embodiments of this disclosure are merely for description purpose but do not imply the preference among the embodiments.

Figure 21:
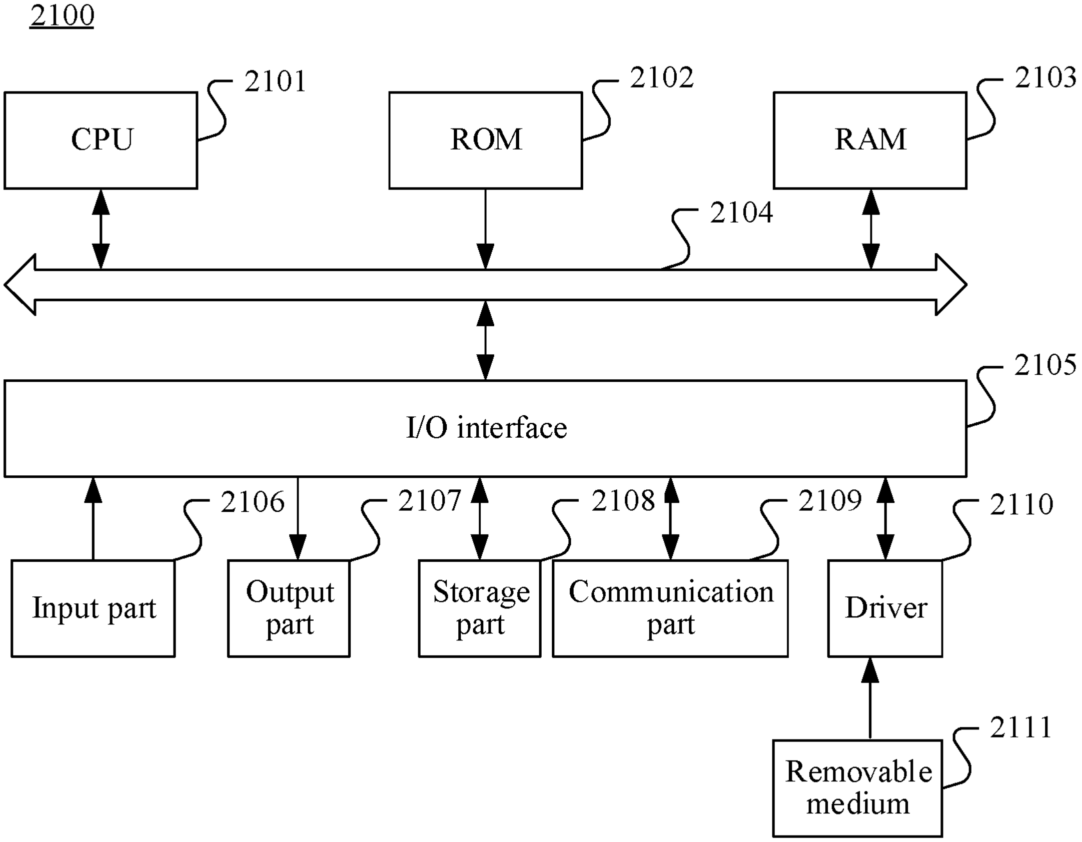
FIG. 21 is a schematic structural diagram of a display product for a game screen according to an embodiment of this disclosure.

FIG. 21 is a schematic structural block diagram of a computer system for implementing an electronic device according to an embodiment of this disclosure.

The computer system 2100 of the electronic device shown in FIG. 21 is merely an example and is not to constitute any limitation on functions and use scopes of the embodiments of this disclosure.

As shown in FIG. 21, the computer system 2100 includes the CPU 2101, which can perform various suitable actions and processing based on a program stored in a read-only memory (ROM) 2102 or a program loaded from a storage part 2108 into a random access memory (RAM) 2103. The RAM 2103 further stores various programs and data required for system operations. The CPU 2101, the ROM 2102, and the RAM 2103 are connected to one another through a bus 2104. An input/output (I/O) interface 2105 is also connected to the bus 2104.

The following components are connected to the I/O interface 2105: an input part 2106 including a keyboard, a mouse, or the like; an output part 2107 including a cathode ray tube (CRT), a liquid crystal display (LCD), a speaker, or the like; the storage part 2108 including a hard disk, or the like; and the communication part 2109 including a network interface card such as a local area network (LAN) card or a modem. The communication part 2109 performs communication processing by using a network such as the Internet. A driver 1210 is also connected to the I/O interface 2105 as required. The removable medium 2111, such as a magnetic disk, an optical disc, a magneto-optical disk, or a semiconductor memory, is mounted on the drive 1210 as required, so that a computer program read therefrom is installed into the storage part 2108 as required.

Particularly, according to the embodiments of this disclosure, the processes described in the various method flowcharts may be implemented as computer software programs. For example, this embodiment of this disclosure includes a computer program product, including a computer program carried on a computer-readable medium. The computer program includes program code used for performing the methods shown in the flowcharts. In such an embodiment, the computer program may be downloaded from a network and installed through the communication part 2109, and/or may be installed from the removable medium 2111. When the computer program is executed by the CPU 2101, the various functions defined in the system of this disclosure are performed.

Figure 22:
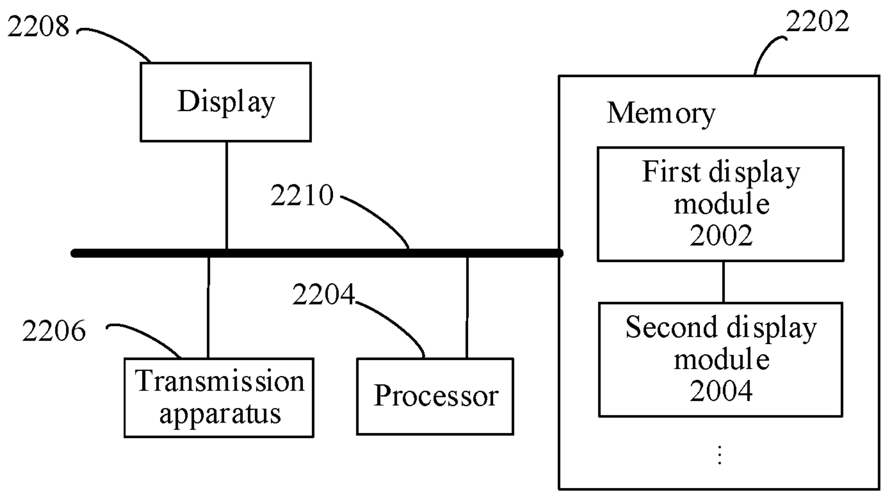
FIG. 22 is a schematic structural diagram of an electronic device according to an embodiment of this disclosure.

According to still another aspect of the embodiments of this disclosure, an electronic device configured to implement the foregoing interaction method for game live-streaming is further provided. The electronic device may be the terminal device or the server shown in FIG. 1. In this embodiment, an example in which the electronic device is the terminal device is used for description. As shown in FIG. 22, the electronic device includes a memory 2202 (for example, a non-transitory computer-readable storage medium) and a processor 2204 (processing circuitry). The memory 2202 stores a computer program. The processor 2204 is configured to perform the steps in any one of the foregoing method embodiments through the computer program.

In this embodiment, the foregoing electronic device may be located in at least one of a plurality of network devices in a computer network.

In this embodiment, the foregoing processor may be configured to perform the following steps through the computer program:

S1. Display a first game interface of a target game application, the first game interface including a game live-streaming screen of the target game application.

S2. Display a second game interface and a target screen of the target game application in response to a first trigger operation for the game live-streaming screen, and display the game live-streaming screen in the target screen, the target screen being located in a first region of the second game interface.

A person of ordinary skill in the art may understand that, the structure shown in FIG. 22 is only schematic. The electronic device may be a terminal device such as a smartphone (such as an Android mobile phone or an iOS mobile phone), a tablet computer, a palmtop computer, a mobile Internet device (MID), or a PAD. FIG. 22 does not constitute a limitation on a structure of the foregoing electronic device. For example, the electronic device may further include more or fewer components (such as a network interface) than those shown in FIG. 22, or has a configuration different from that shown in FIG. 22.

The memory 2202 may be configured to store a software program and a module, for example, a program instruction/module corresponding to an interaction method and apparatus for game live-streaming in an embodiment of this disclosure. The processor 2204 runs the software program and the module that are stored in the memory 2202 to perform various functional applications and data processing, that is, implement the foregoing interaction method for game live-streaming. The memory 2202 may include a high-speed random memory, and may also include a non-volatile memory, for example, one or more magnetic storage apparatuses, a flash memory, or another non-volatile solid-state memory. In some embodiments, the memory 2202 may further include memories remotely disposed relative to the processor 2204, and the remote memories may be connected to a terminal through a network. Examples of the network include, but are not limited to, the Internet, an intranet, a local area network, a mobile communication network, and a combination thereof. The memory 2202 may be specifically configured to store a game screen, a live-streaming screen, and other information, but is not limited thereto. In an example, as shown in FIG. 22, the memory 2202 may include, but is not limited to, the first display module 2002 and the second display module 2004 in the foregoing display apparatus for game live-streaming. In addition, the memory 2202 may further include, but is not limited to, other modules and units in the display apparatus for game live-streaming. Details are not described again in this example.

A transmission apparatus 2206 is configured to receive or send data by using a network. Specific examples of the foregoing network may include a wired network and a wireless network. In an example, the transmission apparatus 2206 includes a network interface controller (NIC). The NIC may be connected to another network device and a router by using a network cable, so as to communicate with the Internet or a local area network. In an example, the transmission apparatus 2206 is a radio frequency (RF) module, which communicates with the Internet in a wireless manner.

In addition, the foregoing electronic device further includes: a display 2208, configured to display the foregoing game screen; and a connection bus 2210, configured to connect the various modules and components in the electronic device.

In other embodiments, the terminal device or the server may be a node in a distributed system. The distributed system may be a blockchain system. The blockchain system may be a distributed system formed by connecting a plurality of nodes through network communication. A peer-to-peer (P2P) network can be constituted between nodes. A computing device in any form, for example, an electronic device such as a server or a terminal can become one node in the blockchain system by joining the peer-to-peer network.

According to one aspect of the application, a computer-readable storage medium is provided. A processor of a computer device reads the computer instruction from the computer-readable storage medium, and the processor executes the computer instruction, so that the computer device performs the interaction method for game live-streaming provided in various implementations of aspects of displaying the game screen.

In this embodiment, the foregoing computer-readable storage medium may be configured to store a computer program used for performing the following steps:

S1. Display a first game interface of a target game application, the first game interface including a game live-streaming screen of the target game application.

S2. Generate and display a second game interface and a target screen of the target game application in response to a first trigger operation for the game live-streaming screen, and display the game live-streaming screen in the target screen, the target screen being located in a first region of the second game interface.

In this embodiment, a person of ordinary skill in the art can understand that, all or some steps in the methods in the foregoing embodiments may be performed by a program instructing related hardware of a terminal device. The program may be stored in a computer-readable storage medium. The storage medium may include: a flash drive, a ROM, a (RAM), a magnetic disk, an optical disc, and the like.

The sequence numbers of the foregoing embodiments of this disclosure are merely for description purpose but do not imply the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this disclosure essentially, or a part contributing to the related art, or all or a part of the technical solution may be implemented in a form of a software product. The computer software product is stored in a storage medium and includes several instructions for instructing one or more computer devices (which may be a personal computer, a server, a network device, or the like) to perform all or some of the steps of the methods in the embodiments of this disclosure.

In the foregoing embodiments of this disclosure, descriptions of the embodiments have respective focuses. As for parts that are not described in detail in one embodiment, reference may be made to the relevant descriptions of the other embodiments.

In the several embodiments provided in this disclosure, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual needs to achieve the objectives of the solutions of the embodiments.

In addition, functional units in the embodiments of this disclosure may be integrated into one processing unit, or each of the units may exist alone physically, or two or more units may be integrated into one unit. The integrated unit may be implemented in a form of hardware, or may be implemented in a form of a software functional unit.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

The foregoing disclosure includes some exemplary embodiments of this disclosure which are not intended to limit the scope of this disclosure. Other embodiments shall also fall within the scope of this disclosure.

What is claimed is:

1. An interaction method for game live-streaming, the method comprising:

displaying, on a terminal device, a first game interface of a game application, the first game interface including a live-streaming screen displaying live-streaming content of the game application;

detecting, on the first game interface, a first trigger operation associated with the live-streaming screen; and in response to detecting the first trigger operation, generating a second game interface of the game application, switching a displayed game interface from the first game interface to the second game interface while continuing to display the live-streaming content of the game application, the second game interface being different from the first game interface, creating a native picture-in-picture view and adding the native picture-in-picture view to a target view created by a game engine of the game application without obtaining system permissions of a floating window in the terminal device, the first game interface being displayed in the target view, creating a view of a native player and adding the view of the native player to the native picture-in-picture view, and displaying, on the terminal device, the live-streaming content in the native picture-in-picture view using the native player, the native picture-in-picture view being in a first region of the second game interface, the second game interface including one or more game application control elements that are displayed separately from the native picture-in-picture view and configured to receive a game operation different from a playback control operation for the live-streaming content.

2. The method according to claim 1, further comprising:

hiding the native picture-in-picture view in response to a second trigger operation during the display of the live-streaming content in the native picture-in-picture view; and displaying the native picture-in-picture view in response to a third trigger operation in a state where the native picture-in-picture view is in a hidden state.

3. The method according to claim 2, wherein the hiding the native picture-in-picture view in response to the second trigger operation comprises hiding the native picture-in-picture view in response to a first slide operation during the display of the live-streaming content in the native picture-in-picture view; and the displaying the native picture-in-picture view in response to the third trigger operation comprises displaying the native picture-in-picture view in response to a second slide operation in a state where the native picture-in-picture view is in the hidden state, a slide direction of the first slide operation being opposite to a slide direction of the second slide operation.

4. The method according to claim 1, wherein the first trigger operation comprises at least one of:

a touch interactive operation associated with the live-streaming screen;

a gesture operation associated with the live-streaming screen;

a voice interaction operation associated with the live-streaming screen; or a mouse control operation associated with the live-streaming screen.

5. The method according to claim 1, wherein the switching the displayed game interface from the first game interface to the second game interface comprises:

switching the displayed game interface from the first game interface to a previous game interface before entry of the first game interface, the second game interface being the previous game interface; or switching the displayed game interface from the first game interface to a game lobby interface of the game application, the second game interface being the game lobby interface.

6. The method according to claim 1, further comprising:

switching the displayed game interface from the second game interface to a third game interface of the game application in response to a fourth trigger operation associated with the second game interface, maintaining a location of the native picture-in-picture view unchanged, and continuing to display the live-streaming content in the native picture-in-picture view.

7. The method according to claim 6, wherein the switching the displayed game interface from the second game interface to the third game interface comprises, when the fourth trigger operation triggers start of a game, switching the displayed game interface from the second game interface to a start interface of the game in response to the fourth trigger operation, the third game interface being the start interface of the game; and the method further comprises: displaying a fourth game interface after the game is started, displaying a game screen of the game in the fourth game interface, and continuing to display the live-streaming content in the native picture-in-picture view.

8. The method according to claim 6, further comprising:

during the display of the third game interface, generating and displaying a fourth game interface in the game application in response to one or more trigger operations configured to start a game, displaying a game screen of the game in the fourth game interface, and continuing to display the live-streaming content in the native picture-in-picture view.

9. The method according to claim 1, wherein the creating the view of the native player and adding the view of the native player to the native picture-in-picture view comprises:

calling a native multimedia component through the game engine to create the view of the native player, and adding the view of the native player to the native picture-in-picture view, the native player being implemented by the native multimedia component.

10. The method according to claim 1, further comprising:

creating a view of a player control component, and overlaying the view of the player control component on the view of the native player in the native picture-in-picture view, the player control component being configured to control playing of the live-streaming content displayed in the native picture-in-picture view.

11. The method according to claim 10, wherein the creating the view of the player control component, and overlaying the view of the player control component on the view of the native player in the native picture-in-picture view comprises:

calling a native multimedia component through the game engine to create the view of the player control component, and overlaying the view of the player control component on the view of the native player in the native picture-in-picture view, the native player and the player control component being implemented by the native multimedia component.

12. The method according to claim 1, further comprising:

initializing a picture-in-picture function module in the game application, and transmitting a target request to a backend device of the game application;

obtaining a picture-in-picture function switch configuration transmitted by the backend device in response to the target request, the picture-in-picture function switch configuration including information corresponding to presenting and disabling a picture-in-picture function entry in the game application, and the picture-in-picture function entry being used for displaying the live-streaming content in the native picture-in-picture view; and displaying the picture-in-picture function entry in the game application when the picture-in-picture function switch configuration is set to presenting the picture-in-picture function entry.

13. An apparatus for game live-streaming, the apparatus comprising:

processing circuitry configured to display, on a terminal device, a first game interface of a game application, the first game interface including a live-streaming screen displaying live-streaming content of the game application;

detect, on the first game interface, a first trigger operation associated with the live-streaming screen; and in response to detecting the first trigger operation, generate a second game interface of the game application, switch a displayed game interface from the first game interface to the second game interface while continuing to display the live-streaming content of the game application, the second game interface being different from the first game interface, create a native picture-in-picture view and add the native picture-in-picture view to a target view created by a game engine of the game application without obtaining system permissions of a floating window in the terminal device, the first game interface being displayed in the target view, create a view of a native player and add the view of the native player to the native picture-in-picture view, and display, on the terminal device, the live-streaming content in the native picture-in-picture view using the native player, the native picture-in-picture view being in a first region of the second game interface, the second game interface including one or more game application control elements that are displayed separately from the native picture-in-picture view and configured to receive a game operation different from a playback control operation for the live-streaming content.

14. The apparatus according to claim 13, wherein the processing circuitry is further configured to:

hide the native picture-in-picture view in response to a second trigger operation during the display of the live-streaming content in the native picture-in-picture view; and display the native picture-in-picture view in response to a third trigger operation in a state where the native picture-in-picture view is in a hidden state.

* * * * *